US011824698B2

(12) United States Patent
Su et al.

(10) Patent No.: US 11,824,698 B2
(45) Date of Patent: Nov. 21, 2023

(54) METHOD AND DEVICE FOR SCHEDULING REQUEST IN NB IOT SYSTEMS

(71) Applicant: Samsung Electronics Co., Ltd., Suwon-si (KR)

(72) Inventors: Di Su, Beijing (CN); Feifei Sun, Beijing (CN)

(73) Assignee: Samsung Electronics Co., Ltd., Suwon-si (KR)

(*) Notice: Subject to any disclaimer, the term of this patent is extended or adjusted under 35 U.S.C. 154(b) by 657 days.

(21) Appl. No.: 16/899,106

(22) Filed: Jun. 11, 2020

(65) Prior Publication Data
US 2020/0305190 A1    Sep. 24, 2020

Related U.S. Application Data

(63) Continuation of application No. 15/926,321, filed on Mar. 20, 2018, now Pat. No. 11,109,423.

(30) Foreign Application Priority Data

Mar. 24, 2017  (CN) ......................... 201710184821.9
Apr. 26, 2017  (CN) ......................... 201710282236.2
Jun. 9, 2017   (CN) ......................... 201710432231.3

(51) Int. Cl.
*H04L 27/26*    (2006.01)
*H04W 74/08*    (2009.01)
(Continued)

(52) U.S. Cl.
CPC ...... *H04L 27/26025* (2021.01); *H04J 11/005* (2013.01); *H04L 1/08* (2013.01);
(Continued)

(58) Field of Classification Search
CPC ... H04L 27/26025; H04L 1/08; H04L 1/1664; H04L 1/18; H04L 1/1858; H04L 5/0053;
(Continued)

(56) References Cited

U.S. PATENT DOCUMENTS 9,066,336 B2   6/2015   Liang et al.
9,414,298 B1   8/2016   Pasupuleti et al.
(Continued)

FOREIGN PATENT DOCUMENTS

CN    101917766 A    12/2010
CN    105230107 A    1/2016
(Continued)

OTHER PUBLICATIONS

3GPP TSG RAN WG1 NB-IoT Ad-Hoc Meeting. Mediatek Inc: "Discussion on UCI transmissin for NB-IOT", R1-161910, Mar. 16, 2016, XP051081027.
(Continued)

*Primary Examiner* — Jung H Park
(74) *Attorney, Agent, or Firm* — Jefferson IP Law, LLP

(57) ABSTRACT

A method and device for reporting scheduling request are provided. The method includes the operations of acquiring a dedicated physical resource of a random access channel (RACH) configured to report a scheduling request, when the scheduling request is triggered, transmitting the RACH on the dedicated physical resource. The dedicated physical resource includes a plurality of periodic physical resources. Through this dedicated physical resource, the user equipment (UE) can report scheduling request in a contention-free random access way, and the capacity of a preamble sequence is improved and inter-cell interference is reduced.

10 Claims, 12 Drawing Sheets

(51) Int. Cl.
  *H04L 1/18*     (2023.01)
  *H04L 5/00*     (2006.01)
  *H04L 1/08*     (2006.01)
  *H04L 1/1607*   (2023.01)
  *H04L 1/1829*   (2023.01)
  *H04J 11/00*    (2006.01)
  *H04W 72/20*    (2023.01)
  *H04W 74/00*    (2009.01)

(52) U.S. Cl.
  CPC .............. *H04L 1/1664* (2013.01); *H04L 1/18* (2013.01); *H04L 1/1858* (2013.01); *H04L 5/0053* (2013.01); *H04W 72/20* (2023.01); *H04W 74/085* (2013.01); *H04W 74/0833* (2013.01); *H04J 11/0073* (2013.01); *H04J 11/0076* (2013.01); *H04L 5/0007* (2013.01); *H04W 74/002* (2013.01)

(58) Field of Classification Search
  CPC .... H04L 5/0007; H04L 1/1671; H04J 11/005; H04J 11/0073; H04J 11/0076; H04W 72/20; H04W 74/0833; H04W 74/085; H04W 74/002; H04W 72/21
  See application file for complete search history.

(56) References Cited

U.S. PATENT DOCUMENTS

| | | | |
|---|---|---|---|
| 10,285,197 | B2 | 5/2019 | Nan et al. |
| 10,455,504 | B2 | 10/2019 | Li et al. |
| 2009/0201868 | A1 | 8/2009 | Chun et al. |
| 2012/0195281 | A1 | 8/2012 | Kim |
| 2013/0163537 | A1 | 6/2013 | Anderson et al. |
| 2014/0241302 | A1 | 8/2014 | Korhonen et al. |
| 2015/0257144 | A1 | 9/2015 | Hooli et al. |
| 2017/0013643 | A1 | 1/2017 | Nan et al. |
| 2017/0347270 | A1* | 11/2017 | Iouchi .................. H04L 5/0098 |
| 2018/0062904 | A1 | 3/2018 | Hwang et al. |
| 2018/0110066 | A1 | 4/2018 | Luo et al. |
| 2018/0139764 | A1 | 5/2018 | Hwang et al. |
| 2018/0248675 | A1* | 8/2018 | Bhattad ............. H04W 72/0466 |
| 2018/0279324 | A1* | 9/2018 | Wang .................... H04L 5/0055 |
| 2019/0364601 | A1 | 11/2019 | Kazmi et al. |

FOREIGN PATENT DOCUMENTS

| | | |
|---|---|---|
| CN | 105992373 A | 10/2016 |
| WO | 2014/113546 A1 | 7/2014 |
| WO | 2016/163855 A1 | 10/2016 |
| WO | 2016/167614 A1 | 10/2016 |

OTHER PUBLICATIONS

3GPP TSG-RAN WG1 NB-Iot Ad-Hoc Meeting. Nokia Networks et al."UCI for NB-IoT", R1-161852, Mar. 16, 2016, XP051080969.
European search report dated on Feb. 17, 2020, issued in European Application No. 18771003.3.
Intel Corporation, "Scheduling Request Design for NR", 3GPP TSG RAN WG1 Meeting #88, Feb. 2017, R1-1702234, Athens, Greece.
Samsung, "On NR Scheduling Request", 3GPP TSG RAN WG1 Meeting #88, Feb. 2017, R1-1702993, Athens, Greece.
Texas Instruments, "Multiplexing CSI and HARQ-ACK for a UE configured for format 1b with channel selection", 3GPP TSG RAN WG1 #70, R1-123667 Aug. 13-17, 2012.
Korean Office Action dated Aug. 11, 2022, issued in Korean Application No. 10-2019-7027792.
Chinese Office Action dated Aug. 3, 2022, issued in Chinese Application No. 201710432231.3.
Indian Office Action dated Sep. 22, 2022, issued in Indian Application No. 201937037960.

* cited by examiner

NPRACH Symbol Group

| Cyclic prefix | Symbol 0 | Symbol 1 | Symbol 2 | Symbol 3 | Symbol 4 |

|←—— As new cyclic prefixes ——→|

METHOD AND DEVICE FOR SCHEDULING REQUEST IN NB IOT SYSTEMS

CROSS-REFERENCE TO RELATED APPLICATION(S)

This application is a continuation application of prior application Ser. No. 15/926,321, filed on Mar. 20, 2018, which was based on and claimed priority under 35 U.S.C. § 119(a) of Chinese Patent Application No. 201710184821.9, filed on Mar. 24, 2017, in the Chinese Patent Office, of Chinese Patent Application No. 201710282236.2, filed on Apr. 26, 2017, in the Chinese Patent Office, and of Chinese Patent Application No. 201710432231.3, filed on Jun. 9, 2017, in the Chinese Patent office, the disclosure of each of which is incorporated by reference herein in its entirety.

TECHNICAL FIELD

The disclosure relates to the technical field of narrowband (NB) internet of things (IoT). More particularly, the disclosure relates to a method and device for reporting a scheduling request in NB IoT systems.

BACKGROUND

To meet the demand for wireless data traffic having increased since deployment of 4th-generation (4G) communication systems, efforts have been made to develop an improved 5th-generation (5G) or pre-5G communication system. Therefore, the 5G or pre-5G communication system is also called a 'beyond 4G network' or a 'post long term evolution (LTE) system'.

The 5G communication system is considered to be implemented in higher frequency millimeter wave (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid frequency shift keying (FSK) and quadrature amplitude modulation (QAM) modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

Narrowband internet of things (NB IoT) technology defines wireless access of a cellular internet of things, which is greatly based on a non-backward compatible electric-universal telecommunication radio access (E-UTRA), enhances an extreme cover scene, and supports a huge amount of low-speed internet of things user equipment (UEs), low-delay sensitivity, ultra-low cost and power devices, and optimized network system architectures.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and device for reporting scheduling request in narrowband (NB) internet of things (IoT) systems, to solve at least one of the problem of excessive low use efficiency of system resources in the current NB IoT transmission scheduling request technology, and the problem of insufficient capacity of narrowband physical random access channel (NPRACH).

In accordance with an aspect of the disclosure, a method for reporting scheduling request in NB IoT systems is provided. The method includes acquiring a dedicated physical resource of an NPRACH used for scheduling request and, when the scheduling request is triggered, transmitting the RACH on the dedicated physical resource for reporting the scheduling request, wherein the dedicated physical resource comprises a plurality of periodic physical resources.

In one embodiment, the dedicated physical resource comprises a time resource, a frequency resource and a sequence resource.

In one embodiment, the time resource and frequency resource are acquired according to a first system rule, or are configured by an evolved Node B (eNB).

The operation of being configured by the eNB comprises indicating, by the eNB, a subcarrier index and/or a subframe index and/or repetition number for reporting scheduling request, the first system rule comprises transmitting, by using the subcarrier used in an initial access, an NPRACH as a scheduling request, or, by the first system rule, determining, according to the user equipment (UE) identity, a time-and-frequency resource, a time resource or a frequency resource, and, the time-and-frequency resource comprises a subcarrier and subframe for transmitting an NPRACH, the time resource comprises the subframe for transmitting an NPRACH, and the frequency resource comprises a subcarrier for transmitting an NPRACH.

In one embodiment, the sequence resource comprises a preamble sequence, by the UE, acquiring, according to a preamble sequence acquisition rule, configuration information of the preamble sequence, the preamble sequence acquisition rule comprises at least one of a first rule that a unique preamble sequence is acquired or a second rule that the preamble sequence is determined according to a cell identity.

In one embodiment, the sequence resource comprises multiple preamble sequences, the length of the preamble sequence is $M_{rep}$, where $M_{rep}$ is the submultiple of the number of the total NPRACH repetitions, and the generation rule of the preamble sequence is within each repetition of the NPRACH, one same element of the preamble sequence is transmitted by each symbol, and elements of preamble sequence is transmitted in sequence by every $M_{rep}$ repetitions of the NPRACH, or, if the length of the preamble sequence is the same as the number of the symbol groups of NPRACH, the generation rule of the preamble sequence is one element of the preamble sequence is transmitted repeatedly by all the symbols within one symbol group of the NPRACH, and each element of the preamble sequence is transmitted in sequence according to a sequence of symbol groups, or, if the length of the preamble sequence is the same as the total number of symbols of $M_{rep}$ repetitions of the NPRACH, the generation rule of the preamble sequence is during $M_{rep}$ repetitions, different elements of the preamble sequence are exhaustively transmitted in sequence by each oft-repeated symbol of the NPRACH.

In one embodiment, the sequence resource comprises the frequency shift on the symbol groups of NPRACH, by the UE, acquiring, according to a frequency shift value acquisition rule, the frequency shift value acquisition rule comprises at least one of the following there is the same frequency shift on top of multiple symbol groups of NPRACH with one or multiple repetitions, and the value of frequency shift to be acquired is determined according to the cell identity, there are different frequency shift values on top of different symbol groups of NPRACH with one or multiple repetitions, and the value of frequency shift to be acquired is determined according to NPRACH format.

In one embodiment, when a same symbol signal is transmitted in each symbol group of an NPRACH, an original cyclic prefix in NPRACH format 0 and 1 with additional one or more symbols are aggregated to form a new longer cyclic prefix, when different signals are transmitted in each symbol group of an NPRACH, there is additional cyclic prefix for each symbol.

In one embodiment, the sequence resource comprises a scrambling sequence, or the sequence resource comprises a scrambling sequence on top of a preamble sequence and the scrambling sequences are orthogonal and generated according to a discrete Fourier transform (DFT) matrix.

In one embodiment, the length, generation rule of the scrambling sequence comprise the length of the scrambling sequence is the same as the number of symbols in one symbol group of NPRACH, the generation rule is that the same scrambling sequence is used by all the symbol groups within an oft-repeated NPRACH of the same UE, or, the length of the scrambling sequence is the same as the length of the symbols of NPRACH with one repetition, and the generation rule is that the same scrambling sequence is used on top of all the symbols of each NPRACH repetition for one UE, or, the length of the scrambling sequence is the same as the number of symbol groups of NPRACH with single repetition, scrambling sequences are superimposed on different symbol groups of one NPRACH for the UE, and all the symbols of each symbol group are multiplied by the same element in the scrambling sequence.

In one embodiment, the index of scrambling sequence for a certain UE is determined according to a UE identity, or by an eNB, the index of scrambling sequence is configured through a UE-specific signaling, and, the scrambling sequence is configured to carry digital volume information (DVI), and by the UE, a scrambling sequence index is determined according to the DVI.

In one embodiment, the method further comprises the following operation of deciding, according to a first decision rule, whether to reattempt to report the scheduling request, wherein the first decision rule comprises, if a random access response (RAR) scrambled by a UE identity is received within an RAR time window, the scheduling request is not attempted to be transmitted, otherwise, deciding whether a terminating attempt condition is met, if so, terminating attempt and if not, reattempting to transmit the scheduling request.

In one embodiment, the terminating attempt condition is after N continuous attempt and waiting for T NPRACH cycle, attempting again, wherein, the value of the parameters N and T is fixed by a system or configured by an eNB.

In accordance with another aspect of the disclosure, an evolved node B (eNB), which is configured to transmit a dedicated physical resource to the UE, so that a UE performs the method for reporting scheduling request in NB IoT systems according to any embodiment of the above.

In accordance with another aspect of the disclosure, a device for reporting scheduling request in NB IoT systems is provided. The device includes an acquisition module configured to acquire a dedicated physical resource of a random access channel (NPRACH) used for reporting scheduling request, wherein the dedicated physical resource comprises a plurality of periodic physical resources, a transmitting module configured to transmit, when a scheduling request is triggered, the NPRACH on the available dedicated physical resource, so as to report the scheduling request.

According to the above method and device for reporting scheduling request in NB IoT systems, acquiring a dedicated physical resource of an NPRACH is used for reporting a scheduling request, wherein the dedicated physical resource comprises a plurality of periodical physical resources. When a scheduling request is triggered, the NPRACH is transmitted on the available dedicated physical resource, so as to report the scheduling request. The dedicated physical resource comprises a time resource, a frequency resource and a sequence resource. Through this dedicated physical resource, the UE can perform reporting a scheduling request in a contention-free random access way, and the capacity of a preamble sequence is improved and inter-cell interference is reduced.

In accordance with another aspect of the disclosure, a method for reporting scheduling request in NB IoT systems is provided. The method includes the operations of acquiring the time-and-frequency resources of the dedicated physical channel for reporting scheduling request, when a scheduling request is triggered, transmitting the dedicated physical channel on the time-and-frequency resource, so as to report the scheduling request, wherein, the dedicated physical channel is a narrowband physical uplink shared channel (NPUSCH) Format 2, or an NPUSCH Format 2 with a high-order modulation mode, or an NPUSCH Format 2 using more than two code words, and the additional code words are used for indicating the scheduling request and a hybrid automatic repeat request (HARQ)-acknowledgement (ACK) information.

In one of the embodiments, the high-order modulation mode comprises a quadrature phase shift keying (QPSK) modulation, and the QPSK symbol carries HARQ-ACK information and the scheduling request at the same time.

In one of the embodiments, the time-and-frequency resources are determined according to a configuration information and/or a third system rule, when the time-and-frequency resources are determined at least according to the configuration information via signaling, the signaling of the configuration information is carried by a narrowband physical downlink shared channel (NPDSCH) or a narrowband physical downlink control channel, and the configuration information is used to assign a subcarrier index, repetition number and transmission time to send the dedicated physical channel of scheduling request, when the time-and-frequency resources are determined at least according to a third system rule, and the dedicated physical channel is an NPUSCH Format 2, a subcarrier index for transmitting a scheduling request is acquired according to a subcarrier index transmitting an HARQ-ACK which is configured in a downlink grant, and the third system rule is used for defining the frequency interval between the two subcarrier indexes, or for defining the time interval from an end time of an NPUSCH Format 2 bearing an HARQ-ACK to an NPUSCH Format 2 transmitting and bearing a scheduling request, and, when the time-and-frequency resource are determined at least according to a third system rule, and the dedicated physical channel is an NPUSCH Format 2 with a high-order modulation mode, or is an NPUSCH Format 2 using more than two code words, a scheduling request information and HARQ-ACK information is transmitted using a time-and-frequency resource for transmitting HARQ-ACK which is configured in a downlink grant.

In one of the embodiments, when a scheduling request is triggered, before transmitting the dedicated physical channel on the time-and-frequency resource so as to report the scheduling request, further deciding, according to a configuration information transmitted by an eNB and/or a second system rule, whether to report the scheduling request, deciding, according to a configuration information transmitted by an eNB and/or a second system rule, whether to report the scheduling request, if not, continually deciding whether there is a conflict between the time-and-frequency resource which is used when a UE transmits a scheduling request currently and the time-and-frequency resource which is used when the eNB schedules the UE to transmit an uplink physical channel, if there is a conflict, abandoning this reporting a scheduling request, or updating, according to a updating rule, a time frequency which is used when reporting a scheduling request, so as to transmit a physical channel for scheduling a request, and, if the UE is currently within an uplink transmitting gap, abandoning the reporting a scheduling request, and, the second system rule comprises deciding, according to a signaling transmitted by an eNB, whether being allowed to report a scheduling request.

In one of the embodiments, the updating rule comprises deferring to report a scheduling request, or, using a subcarrier adjacent to a subcarrier used by an NPUSCH Format 2.

According to another aspect, the embodiment of the disclosure provides an eNB, which is configured to transmit configuration information to a UE, so that the UE performs the method for reporting scheduling request in NB IoT systems according to any embodiment of the above.

According to another aspect, the embodiment of the disclosure provides a device for reporting scheduling request in NB IoT systems, comprising an acquisition module configured to acquire the time-and-frequency resources of a dedicated physical channel for reporting scheduling request, a reporting module configured to transmit the dedicated physical channel on the time-and-frequency resource, so as to report the scheduling request, when a scheduling request is triggered, wherein, the dedicated physical channel is a NPUSCH Format 2, or an NPUSCH Format 2 with a high-order modulation mode, or an NPUSCH Format 2 using more than two code words.

According to the above method and device for reporting scheduling request in NB IoT systems, acquiring the time-and-frequency resources of dedicated physical channel for scheduling request, when a scheduling request is triggered, transmitting the dedicated physical channel on the time-and-frequency resource, so as to report the scheduling request, wherein, the dedicated physical channel is a NPUSCH Format 2, or an NPUSCH Format 2 with a high-order modulation mode, or an NPUSCH Format 2 using more than two code words, and the additional code words are used for indicating the scheduling request and a HARQ-ACK information. The dedicated physical channel can be an NPUSCH Format 2, the UE can transmit a scheduling request and/or perform the feedback of HARQ-ACK information of the NPDCCH according to a configuration information and/or a second system rule, and the reporting a scheduling request and the HARQ-ACK feedback use a same physical channel, but the two respectively use different time-and-frequency resources and carry different information contents. Through this dedicated physical channel, a scheduling request is reported, competition mechanism of the related art is not required to be adopted, and scheduling efficiency can be improved and system resources are saved.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 7 is a schematic diagram of an NPRACH cyclic prefix format according to an embodiment of the disclosure;

FIG. 8 is a schematic diagram of another NPRACH cyclic prefix format according to an embodiment of the disclosure;

Throughout the drawings, like reference numerals will be understood to refer to like parts, components, and structures.

DETAILED DESCRIPTION

Figure 1:
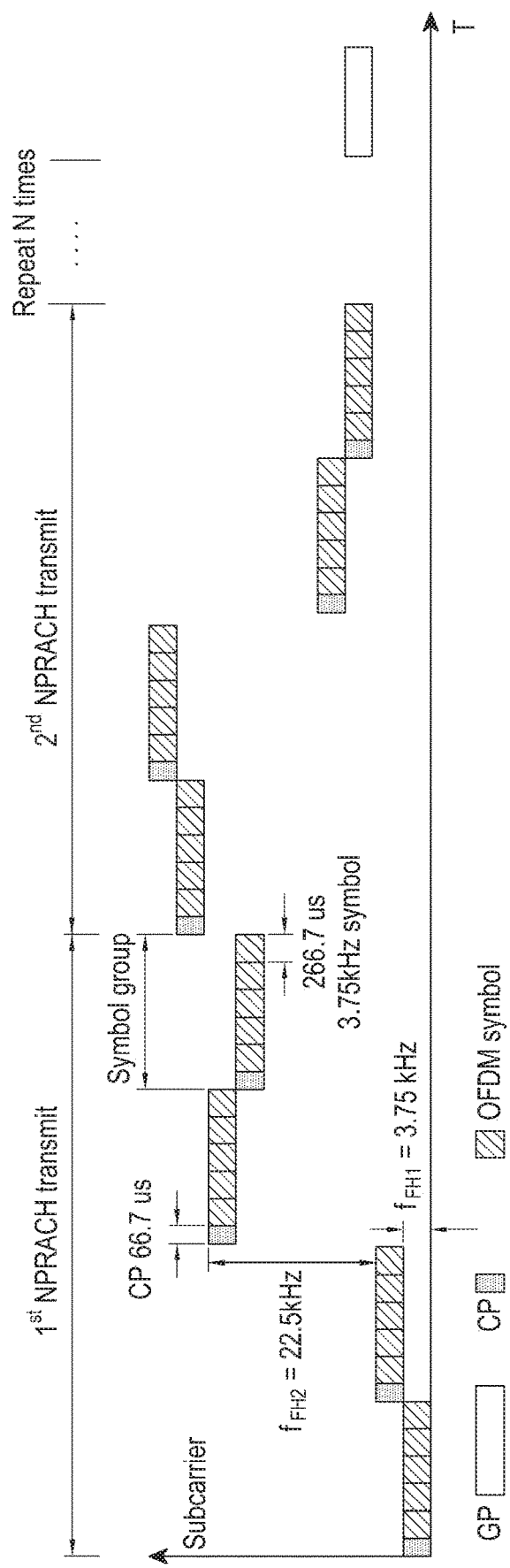
FIG. 1 is a structure diagram of a narrowband physical random access channel (NPRACH) according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It can be understood by those skilled in the art, the singular forms "a," "an," "said" and "the" are intended to include the plural forms as well, unless expressly stated otherwise. It will be further understood that the term "comprising" when used in this specification, specify the presence of stated features, integers, operations, elements, and/or components, but do not preclude the presence or addition of one or more other features, integers, operations, elements, components, and/or groups thereof. It will be understood that when an element is referred to as being "connected" or "coupled" to another element, it can be directly connected or coupled to the other element or intervening elements may be present. In addition, "connected to" or "coupled to" as used herein can comprise wireless connection or coupling. As used herein, the term "and/or" includes any and all combinations of one or more of the associated listed items.

It should be understood by one person of ordinary skill in the art that, unless otherwise defined, all terms (including technical and scientific terms) used herein have the same meaning as commonly understood by one person of ordinary skill in the art to which the disclosure belongs. It should be further understood that terms, such as those defined in commonly used dictionaries, should be interpreted as having a meaning that is consistent with their meanings in the context of the prior art and will not be interpreted in an idealized or overly formal sense unless expressly so defined herein.

It should be understood by one person of ordinary skill in the art that the term "terminal" and "terminal equipment" as used herein compasses not only devices with a wireless signal receiver having no emission capability but also devices with receiving and emitting hardware capable of carrying out bidirectional communication over a bidirectional communication link. Such devices can comprise cellular or other communication devices with a single-line display or multi-line display or without a multi-line display; personal digital assistants (PDAs), which can include radio frequency (RF) receivers, pagers, internet/intranet accesses, web browsers, notepads, calendars and/or global positioning system (GPS) receivers; and/or laptops of the related art and/or palmtop computers or other apparatuses having and/or including a RF receiver. The "terminal" and "terminal apparatus" as used herein may be portable, transportable, mountable in transportations (air, sea and/or land transportations), or suitable and/or configured to run locally and/or distributed in other places in the earth and/or space for running. The "terminal" or "terminal apparatus" as used herein may be a communication terminal, an internet terminal, and a music/video player terminal. For example, it may be a PDA, a mobile internet device (MID) and/or a mobile phone with a music/video playback function, or may be apparatuses such as a smart television (TV) and a set-top box.

FIG. 1 is a structure diagram of a narrowband physical random access channel (NPRACH) according to an embodiment of the disclosure.

Referring to FIG. 1, both the uplink bandwidth and downlink bandwidth of a narrowband (NB) internet of things (IoT) technology system are 200 kHz, the transmission bandwidth is 180 kHz, and there are two protection bandwidth of 10 kHz in front and back, respectively. Compared with long term evolution (LTE), an NB IoT is generally a single service model, thus, the design of a physical layer is simpler. A downlink physical channel (DPCH) merely defines that a narrowband physical broadcast channel (NPBCH) is used for transmitting a main information block. A narrowband physical downlink control channel (NPDCCH) is used for transmitting uplink/downlink grant information, physical downlink control channel (PDCCH) order and downlink grant of scheduling paging information, and indicating to update system message. A narrowband physical downlink shared channel (NPDSCH) is used for transmitting downlink data. Uplink physical channel merely defines that a NPRACH is used for transmitting a random access sequence. A narrowband physical uplink shared channel (NPUSCH) Format 1 is used for transmitting uplink data and NPUSCH Format 2 is used for transmitting 1 bit acknowledgment (ACK)/negative acknowledgement (NACK) information, and indicating whether a user equipment (UE) correctly receives downlink data. In terms of physical signal, a downlink merely has narrowband primary synchronization signal (NPSS), a narrowband secondary synchronization signal (NSSS) and a narrowband reference signal (NRS), while an uplink merely has demodulation reference signal (DMRS) of NPUSCH Format 1 and NPUSCH Format 2, and is not allowed to transmit periodic or non-periodic uplink detection reference signal.

In order to support an extreme coverage area, the repeated transmissions of the above physical channels are supported by an NB IoT. For various downlink physical channels, except NPBCH being transmitted repeatedly with a fixed number, the number of repeated transmission of NPDCCH and the number of repeated transmission of NPDSCH both can be configured, and can be up to 2048. An uplink physical channel, including NPRACH, NPUSCH Format 1 and NPUSCH Format 2, the number of repeated transmission of which can be configured, can be up to 128. Meanwhile, in terms of uplink transmission, an NB IoT also supports transmission of a single subcarrier. For the most extreme covered UE, a smaller subcarrier interval of 3.75 kHz can be configured. By decreasing transmission bandwidth and increasing power spectral density, reliability of uplink transmission can be promoted efficiently.

In term of physical channel resource allocation, NPBCH, NPSS, NSSS, NPDSCH and NPDCCH (aggregation level 2) all use a full-bandwidth of 180 kHz on a 1 ms subcarrier as a basic resource allocation granularity, and multiplexed transmission of single subframe NPDCCH and single subframe NPDSCH is not supported. NPUSCH Format 1 and NPUSCH Format 2 define, respectively for different transmission bandwidths, scheduled resource units on time dimension, for example, single subcarrier transmission under a subcarrier interval of 3.75 kHz, single subcarrier transmission, 3 subcarrier transmission, 4 subcarrier transmission, 6 subcarrier transmission and 12 subcarrier transmission under a subcarrier interval of 15 kHz. Except under a subcarrier interval of 15 kHz, a subframe of 1 ms is used as a resource unit in 12 subcarrier transmission modes, and under other transmission modes, a size of each resource unit is more than 1 ms, that is, transmission across subframes.

Figure 4:
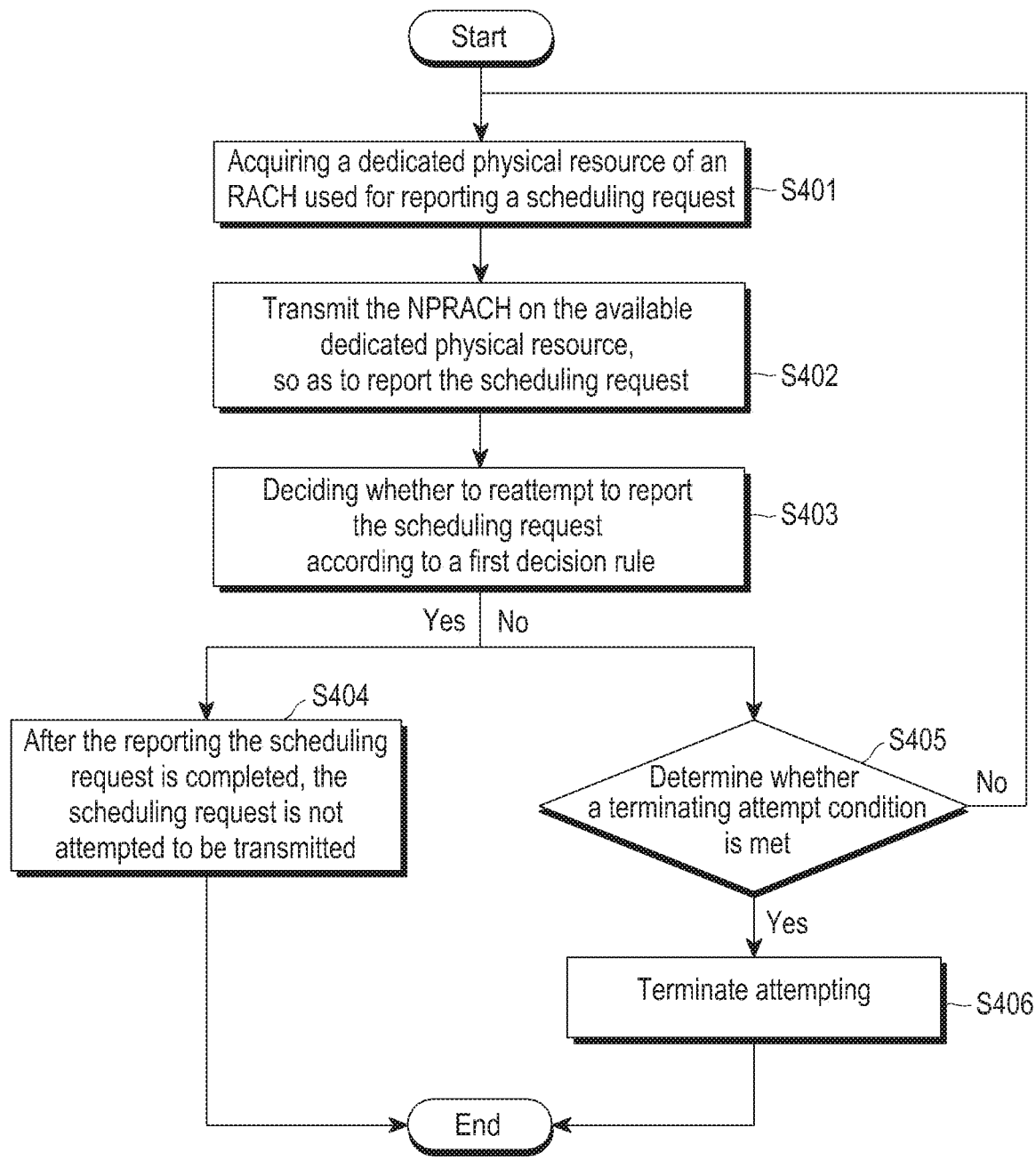
FIG. 4 is a flowchart of a method for reporting a scheduling request in an NB IoT system according to an embodiment of the disclosure.

NPRACH of an NB IoT is transmitted with a fixed subcarrier interval of 3.75 kHz, and a frame structure of NPUSCH is not multiplexed. A single NPRACH consists of four symbol groups, each of which comprises five orthogonal frequency division multiplexing (OFDM) symbols and one cyclic prefix. Each NPRACH transmits an all-ones sequence, the UE estimates a frequency deviation and a timing advance value according to relative frequency-hopping relation between the symbol groups. FIG. 4 shows a schematic diagram of frequency-hopping transmission of single UE NPRACH. To support repeated transmission of NPRACH, the evolved node B (eNB) can configure at most three NPRACH repeated levels, and the UE selects a proper repeated level to perform random access according to a downlink-measured reference signal receiving power and a reference signal receiving power threshold corresponding to each NPRACH repeated level configured by the eNB. NPRACHs of different repeated levels use different physical resource, and the eNB can configure that NPRACHs of different repeated levels use a frequency-division or a time-division physical resource on an anchored carrier. FIG. 1 is a structure diagram of a R14-version NPRACH.

Because an NB IoT system does not define a physical uplink control channel (PUCCH), and does not support a connected-state UE to transmit scheduling request. In a real system, when a connected-state UE has uplink data transmission requirement being required to report a scheduling request, it is required to initiate a contention-based random access process, and digital volume information (DVI) indicating a cached data amount can be carried in contention solution information (MSG4). In an NB IoT, contention-based random access process is similar as that in LTE, however, due to limited system frequency resources and because repetitions are required if all the physical channel transmission of UE is covered, it will consume more system resources to activate a random access process by scheduling a request report, thus use efficiency of system resources is reduced. Meanwhile, due to limited capacity of NPRACH and because a system is required to serve large amounts of UEs, it is more difficult to simultaneously support, based on a current design, an idle-state UE to perform initial access and a connected-state UE to perform random access for purpose of a scheduling request.

Figure 2:
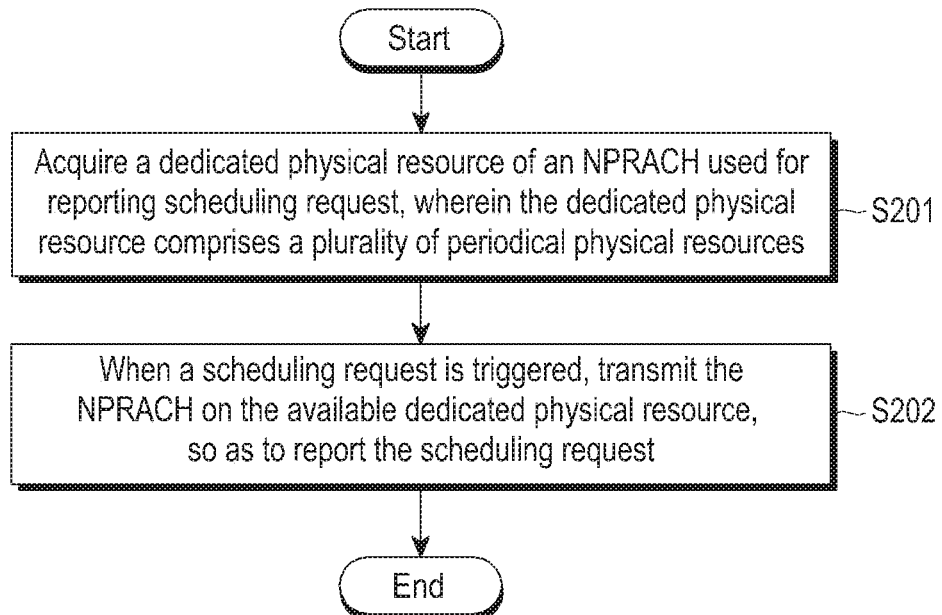
FIG. 2 is a flowchart of a method for reporting a scheduling request in a narrowband (NB) internet of things (IoT) system according to an embodiment of the disclosure.

FIG. 2 is a flowchart of a method for reporting a scheduling request in an NB IoT system according to an embodiment of the disclosure.

Referring to FIG. 2, according to one aspect, a method for scheduling request in an NB IoT system is illustrated.

In operation S201, the method acquires a dedicated physical resource of an NPRACH used for reporting scheduling request, wherein the dedicated physical resource comprises a plurality of periodical physical resources.

In operation S202, when a scheduling request is triggered, the method transmits the NPRACH on the available dedicated physical resource, so as to report the scheduling request.

According to the above method for reporting scheduling request in NB IoT systems, acquiring a dedicated physical resource of an NPRACH used for reporting scheduling request, wherein the dedicated physical resource comprises a plurality of periodical physical resources. When a scheduling request is triggered, the NPRACH is transmitted on the available dedicated physical resource to report the scheduling request. The dedicated physical resource comprises a time resource, a frequency resource and a sequence resource. Through this dedicated physical resource, the UE can perform reporting a scheduling request in a contention-free random access way, and the capacity of a preamble sequence is improved and inter-cell interference is reduced.

Figure 3:
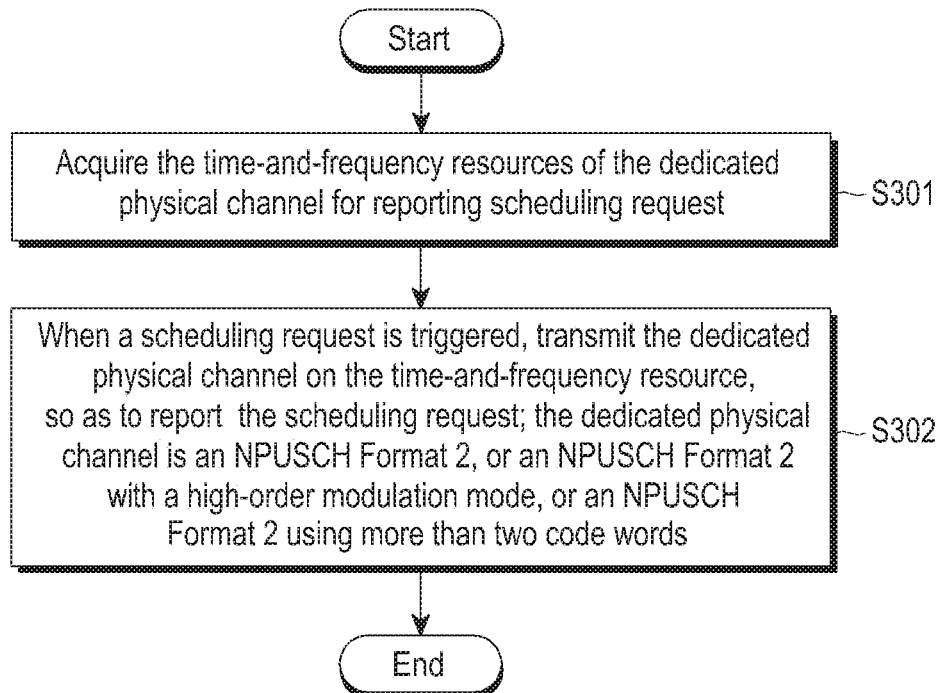
FIG. 3 is a flowchart of a method for reporting a scheduling request in an NB IoT system according to an embodiment of the disclosure.

FIG. 3 is a flowchart of a method for reporting a scheduling request in an NB IoT system according to an embodiment of the disclosure.

Referring to FIG. 3, according to another aspect, the embodiment of the disclosure provides another method for reporting scheduling request in NB IoT systems.

In operation S301, the method acquires the time-and-frequency resources of the dedicated physical channel for reporting scheduling request.

In operation S302, when a scheduling request is triggered, the method transmits the dedicated physical channel on the time-and-frequency resource to report the scheduling request. The dedicated physical channel is an NPUSCH Format 2, or an NPUSCH Format 2 with a high-order modulation mode, or an NPUSCH Format 2 using more than two code words.

According to the above method for reporting scheduling request in NB IoT systems, the time-and-frequency resources of the dedicated physical channel for reporting scheduling request is acquired. When a scheduling request is triggered, the dedicated physical channel is transmitted on the time-and-frequency resource to report the scheduling request. The dedicated physical channel is an NPUSCH Format 2, or an NPUSCH Format 2 with a high-order modulation mode, or an NPUSCH Format 2 using more than two code words. The dedicated physical channel can be an NPUSCH Format 2, the UE can transmit a scheduling request and/or perform the feedback of hybrid automatic repeat request (HARQ)-acknowledgement (ACK) information of the PDCCH according to a configuration information and/or a second system rule, and the reporting a scheduling request and the HARQ-ACK feedback can use a same physical channel, but the two respectively use different time-and-frequency resources and carry different information contents. Through this dedicated physical channel, because a scheduling request is reported, competition mechanism of the related art is not required to be adopted, and scheduling efficiency can be improved and system resources are saved.

Embodiment 1

FIG. 4 is a flowchart of a method for reporting a scheduling request in an NB IoT system according to an embodiment of the disclosure.

Referring to FIG. 4, a method for reporting scheduling request in NB IoT systems is described, which reports the scheduling request through contention-free random access.

In operation S401, the method acquires a dedicated physical resource of an NPRACH used for reporting scheduling request, the dedicated physical resource comprises a plurality of periodical physical resources. For example, the dedicated physical resource comprises a time resource, a frequency resource and a sequence resource.

In operation S402, the method transmits the NPRACH on the available dedicated physical resource to report the scheduling request.

In operation S403, the method decides whether to reattempt to report the scheduling request according to a first decision rule. If the method reattempts to report the scheduling request, the method proceeds to operation S404 or, otherwise proceeds to operation S405.

In operation S404, after the reporting the scheduling request is completed, the scheduling request is not attempted to be transmitted.

In operation S405, the method decides whether a terminating attempt condition is met. If the terminating condition is met, the method proceeds to operation S406. If the terminating condition is not met, the method returns to operation S401 to reattempt to transmit the scheduling request.

In operation S406, the method terminates attempting to report the scheduling request.

For a connected-state UE, an enhanced NPRACH is transmitted on the dedicated time-and-frequency resource to perform uplink the scheduling request. Then, by the UE, if a random access response (RAR) scrambled by a UE identifier is received within an RAR time window, the reporting a scheduling request is completed. Otherwise, the UE performs the process again, until a terminating attempt condition is reached or the reporting a scheduling request is completed.

The terminating attempt condition can be fixed or configured by an eNB. For example, the rule is assumed to be: after N continuous attempt and waiting for T NPRACH cycle, transmitting again, wherein the value of the parameters N and T is fixed by a system or configured by an eNB. The configured parameters can be configured independently for the repeated level of each NPRACH, or can be configured to applicable to common parameters of all repeated levels.

Certainly, a system also cannot configure a terminating attempt condition, if at this time after the UE currently fails to transmit a scheduling request, that is, continually performs the above contention-free random access process, until the reporting a scheduling request is completed.

A possible enhancement of NPRACH can be adding a scrambling sequence on top of the preamble of NPRACH, and by using orthogonal scrambling sequence, thereby allowing multiplexing transmission of multi-UE NPRACHs in the same time-and-frequency resource. In another example, the orthogonal scrambling sequences are used to carry DVI so that a scrambling sequence index is determined by the UE according to the DVI, which is to indicate the UE's uplink data buffer. For example, the length of the scrambling sequence of the enhanced NPRACH is assumed to be N, different UEs can be allowed to use different orthogonal scrambling to transmit an NPRACH on a same time-and-frequency resource. The used scrambling sequence can be determined according to a UE identity (for example, cell radio network temporary identifier (C-RNTI)), for example, $I_{Mask}=N_{UEID}$ mod (N−1), wherein, $N_{UEID}$ is the UE identity, $I_{Mask}$ is the scrambling sequence allocated to the UE, or the scrambling sequence used by the UE can be configured by an eNB according to a UE dedicated signaling, and the mod is a modulus function. An example of the orthogonal scrambling sequence carrying DVI is as follows: the length of the scrambling sequence of the enhanced NPRACH is assumed to be N, an all-ones sequence used by a contention-based NPRACH is excluded, the number of the available orthogonal scrambling sequences of the NPRACH for reporting scheduling request is N−1, the orthogonal scrambling sequence to be used is selected by a UE according to the DVI, the sequence number of the orthogonal scrambling sequence selected by the UE is determined by an eNB according to a way of blind-detection, and the DVI carried by the UE unlink scheduling request.

In addition to improve the capacity of the NPRACH, orthogonal scrambling can also be used for the NPRACH in initial access to support a larger cell radius. The length, generation rule and superimposed mode of the scrambling sequence are all fixed by the system, with different possible implementations. The frequency-hopping format of the current NPRACH in Release 13 and 14 can be inherited when used for scheduling request, or without frequency hopping, that is, the same subcarrier is used for different NPRACH repetitions and also for the different symbol groups within one NPRACH. For example, taking an example of reusing the NPRACH frequency-hopping pattern in Release 13 and 14 specification, FIG. 5 shows a schematic diagram providing different implemented ways of NPRACH scrambling sequence. Specific manners will be described as below with reference to FIG. 5.

Figure 5A:
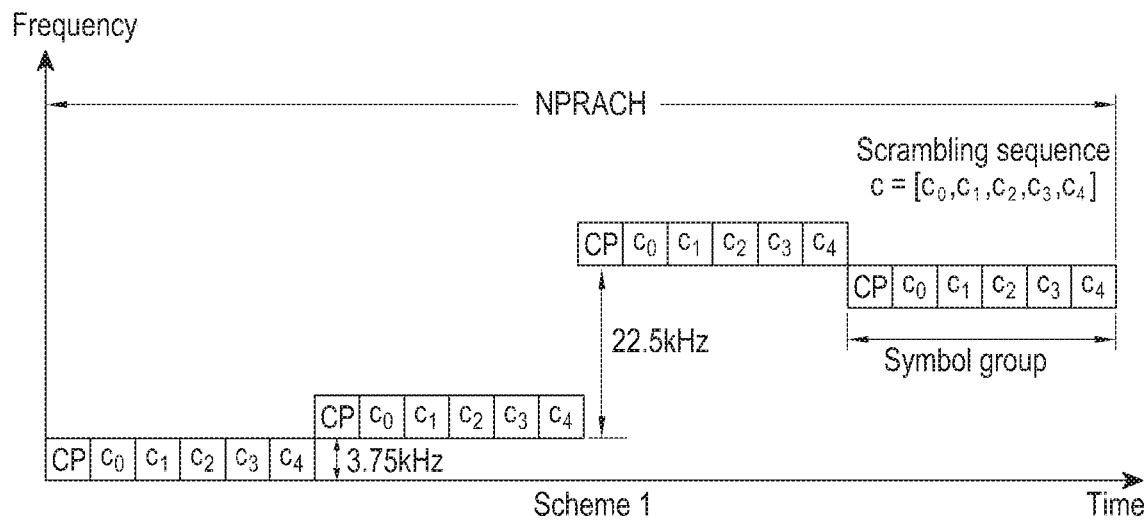
FIGS. 5A and 5B are schematic diagrams of a plurality of implementations of NPRACH cover scrambling according to an embodiment of the disclosure.
Figure 5A:
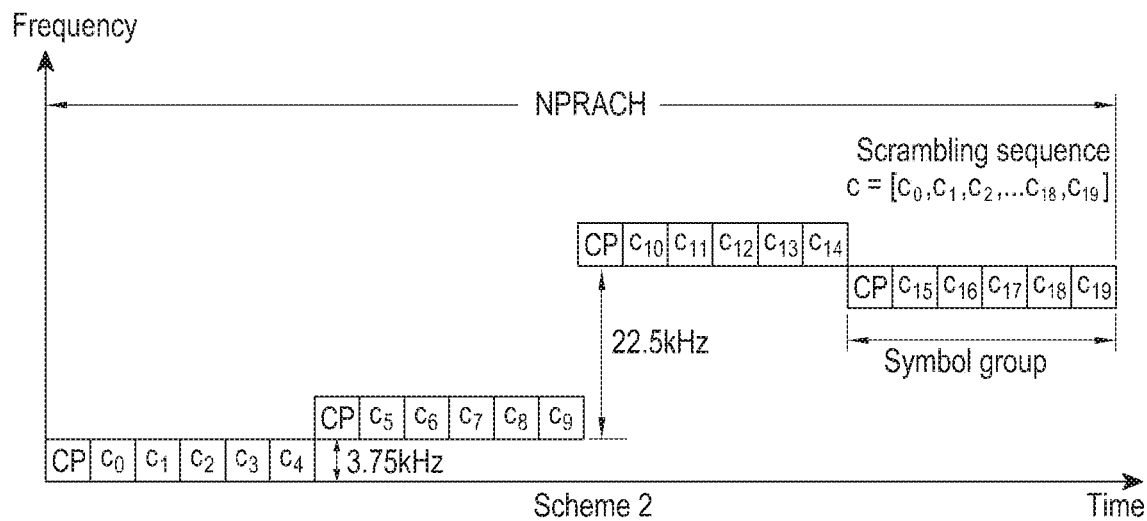
Figure 5B:
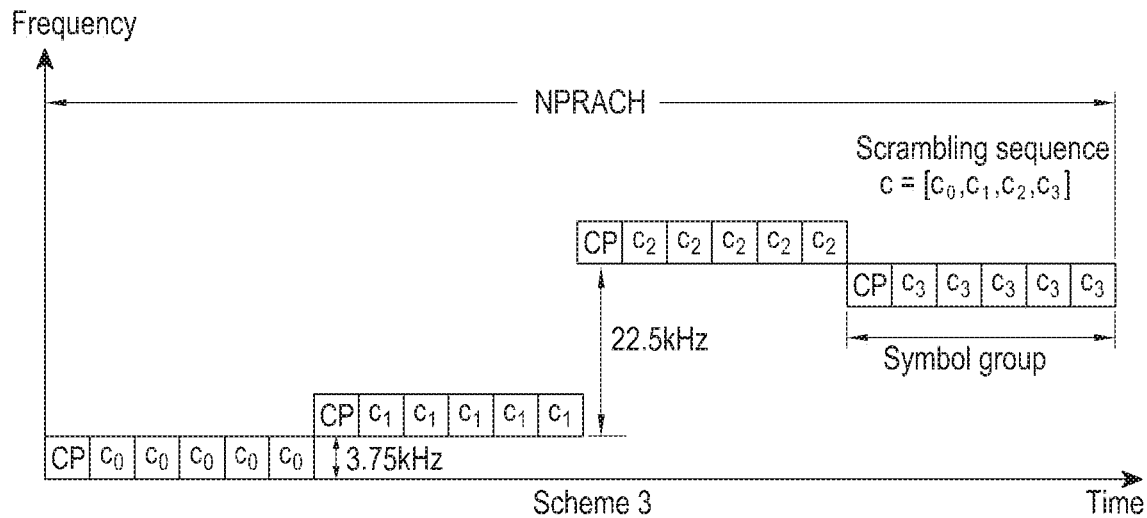
Figure 5B:
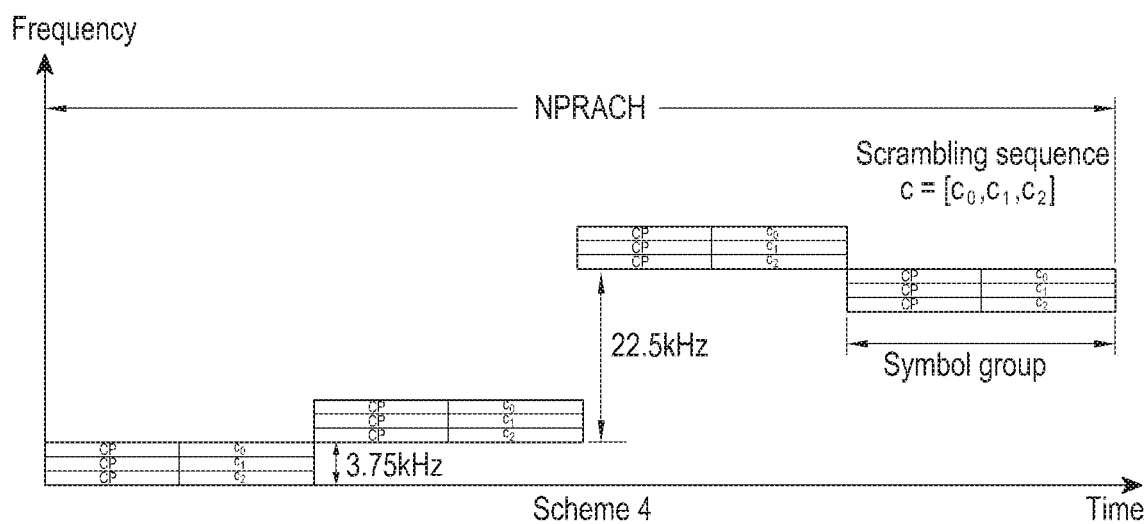

FIGS. 5A and 5B are schematic diagrams of a plurality of implementations of NPRACH cover scrambling according to an embodiment of the disclosure.

1. According to an example embodiment of FIG. 5A, the length of the orthogonal scrambling sequence is the same as the number of symbols within one symbol group of NPRACH, that is, the length is 5, the same scrambling sequence is shared by all the symbol groups within an NPRACH with one or multiple repetitions for the same UE, and the NPRACH preamble sequence will be covered by orthogonal scrambling with vector dot product, that is $[c_1*p_1, \ldots, c_5*p_5]$ or $[c_1*p_1^H, \ldots c_5*p_5^H]$, wherein, $c=[c_1, \ldots, c_5]$ is a scrambling sequence, $p=[p_1, \ldots, p_5]$ is a partial preamble sequence of a symbol group of the NPRACH, $x^H$ denotes a conjugate of a plural x, and the same method to use scrambling sequence on top of NPRACH preamble can be used in the following other implementations of NPRACH scrambling, the expression formula of which is slightly different due to different lengths of the orthogonal scrambling.

2. According to another example embodiment of FIG. 5A, the length of the orthogonal scrambling is the same as the number of symbols of the NPRACH with one repetition, that is, the length is 20, and the same scrambling sequence is used for multiple NPRACH repetitions of the same UE.

3. The length of the orthogonal scrambling is the same as the number of symbol groups of NPRACH with single repetition, that is, the length is 4, scrambling sequences are superimposed on different symbol groups of one NPRACH for the UE, and all the symbols of each symbol group are multiplied by the same element in the scrambling sequence. The elements of a scrambling sequence can be same or different. The elements of the scrambling sequence for the neighboring symbol groups can have the same value. For example, according to an example embodiment in scheme 3 of FIG. 5B, it may let $c_0=c_1$, $c_2=c_3$, that is, the first two symbol groups and the last two symbol groups are enabled to be superimposed with scrambling sequence elements with same value, respectively, and this design can reduce the peak-to-average power ratio of the NPRACH.

4. The orthogonal scrambling is used for transmitting an NPRACH on multiple subcarriers, the length of the scrambling sequence is the same with the number of the subcarriers used by the NPRACH, a scrambling sequence is superimposed on different subcarriers in the same OFDM symbol, and according to an interval between subcarriers, the NPRACH can have different cyclic prefix lengths, so as to support a larger cell radius. For example, according to another example embodiment in scheme 4 of FIG. 5B, an example that a subcarrier interval is 1.25 kHz is provided, at this time, the cyclic prefix length can be 800 us for supporting a cell radius of maximum 120 km. One symbol group in the NPRACH contains one symbol, each symbol contains three resource elements of 1.25 kHz and a scrambling sequence with the length being 3 is superimposed on the three resource elements of each symbol. The length of a scrambling sequence is given, the scrambling sequence can be generated based on different rules, and an orthogonal sequence or a quasi-orthogonal sequence is generated. For example, a discrete Fourier transform (DFT) matrix can be used, and except an all-ones sequence, each of remaining sequences can be the scrambling sequence of the NPRACH for purpose of reporting a scheduling request. For example, as the length is 5, the scrambling sequence formula generated based on a DFT matrix is $$c_n = \left[ 1, \ e^{-j\frac{2\pi \cdot n}{5}}, \ e^{-j\frac{2\pi \cdot 2n}{5}}, \ e^{-j\frac{2\pi \cdot 3n}{5}}, \ e^{-j\frac{2\pi \cdot 4n}{5}} \right],$$

$$n = 1, \ldots, 4.$$

Figure 13:
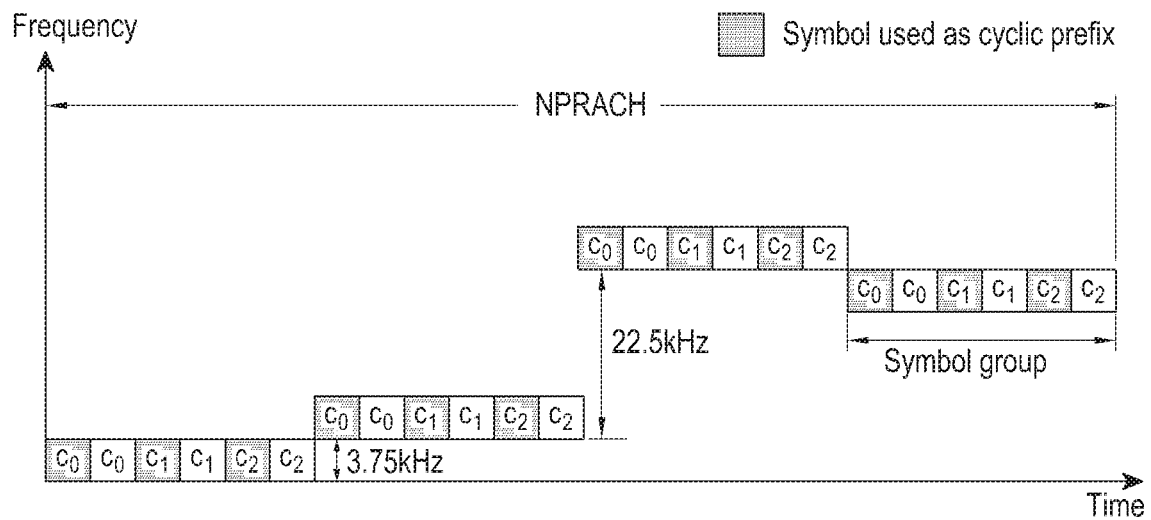
FIG. 13 is a schematic diagram of one example of NPRACH cover scrambling used in large cell radius according to an embodiment of the disclosure.
Figure 13:
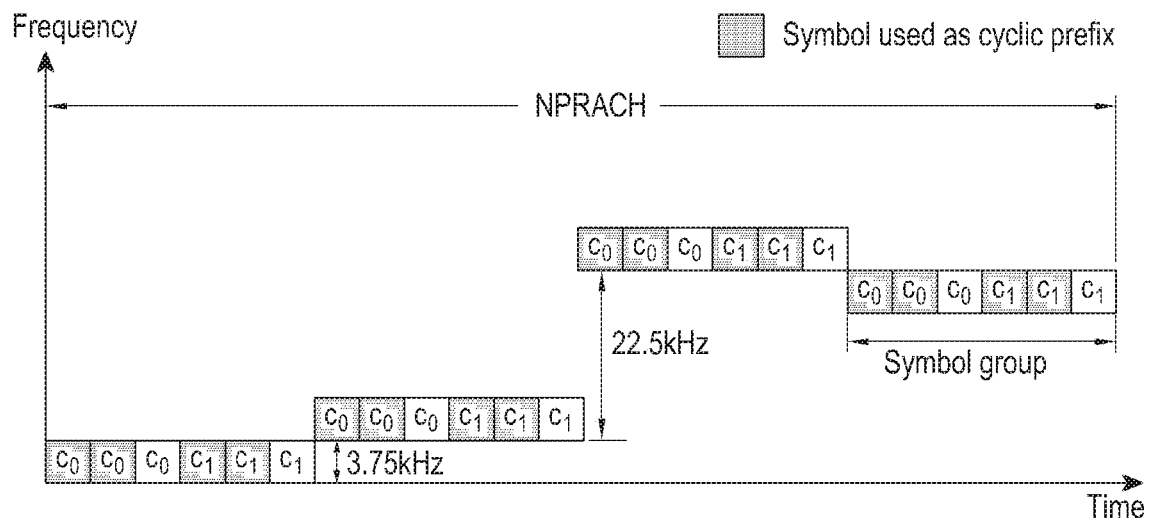

For scheme 1 and scheme 2 to reduce the peak-to-average power ratio, the element used when generating a scrambling sequence can be a modulated symbol of $$\frac{\pi}{2}$$

binary phase shift key (BPSK), or a modulated symbol of $$\frac{\pi}{4}$$

quadrature phase shift key (QPSK) or modulated symbol of $$\frac{\pi}{8}$$

phase shift key (8PSK). In another example, to ensure the orthogonality between subcarriers in the scenario of larger cell radius, the several continuous symbols can be designed to carry the same elements of scrambling sequence while generating the scrambling sequence, which can be applied into all the above implementations of scrambling sequence. In this way, the front symbols can serve as the cyclic prefix of the symbol behind. Taking the first NPRACH scrambling sequence implementation as an example, two corresponding instances of scrambling sequence are shown in FIG. 13.

A UE is required to transmit, on the dedicated time-and-frequency resource thereof, an NPRACH for scheduling request. The dedicated time-and-frequency resource at least includes the index of start subcarrier to transmit NPRACH, and the dedicated time resource at least includes the start subframe index and repetition number to transmit NPRACH. The dedicated time resource can be obtained by a UE according to the first system rule, or can be explicitly configured by the eNB. For example, the dedicated time resource is configured via a UE-specific signaling, and one possible method of explicit configuration can be seen in Embodiment 5. Similarly, the dedicated frequency resource can also be obtained by the UE according to the first system rule, or can be explicitly configured by eNB. For example, the dedicated frequency resource is configured via a UE-specific signaling, which at least includes the start subcarrier index. The configuration method of a dedicated time resource and frequency resource can be different, which can be any combination of the above configuration methods. For instance, the repetition number and start subcarrier index are obtained by UE based on the first system rule, and the start subframe (and/or periodicity of scheduling request) is indicated by explicit signaling. In the following, several examples of the first system rule to determine the dedicated resource will be provided.

First, the first system rule for determining frequency resource can be that the UE sends NPRACH for a scheduling request on the same subcarrier used in the initial access. The first system rule for determining time resource can be that the UE obtain the repetition number and/or start subframe of NPRACH for a scheduling request based on the configuration of NPRACH in the initial access. Or the first rule can determine the start subframe and/or start subcarrier of the NPRACH for scheduling request according to the UE identifier. For example, a same time-and-frequency resource can be assumed to be multiplexed by multiple UEs to transmit an NPRACH for a scheduling request. One rule can be configured as the follows: a location of a dedicated time-and-frequency resources are computed by a UE according to a UE identity (for example, C-RNTI) of a UE, wherein, the location ($I_{sc}$, $I_{period}$) of a time-and-frequency resource can be determined by a lookup table according to a value of ($N_{UEID}/(N_{Mask}-1)$) mod ($N_{sc} \times N_{period}$). The scrambling sequence index is $I_{Mask} = N_{UEID}$ mod ($N_{Mask}-1$), $I_{sc}$ is an index of a subcarrier used when transmitting an NPRACH, $I_{period}$ is an index of an opportunity of transmitting an NPRACH (the period of an NPRACH is used as a basic unit, and one period of an NPRACH is between neighbor random access opportunities), $N_{UEID}$ is a UE identity, $N_{Mask}$ is length of a scrambling sequence, $N_{SC}$ is number of subcarriers configured by a repeated level of a UE-used NPRACH, and the UE can multiplex the repeated level of an NPRACH used when the UE performing initial access so as to perform random access for scheduling request purpose, and $N_{period}$ is number of opportunities of random access.

Or, in the above examples of configuration, one of the time-and-frequency resource can be used as parameter explicitly configured by an eNB, and another parameter can be acquired according to a system rule. For example, a dedicated time resource indicates that $I_{period}$ is used as an explicitly configured parameter, and the dedicated frequency resource indicates that it can be acquired according to the following formula: $I_{sc} = (N_{UEID}/(N_{Mask}-1))$ mod ($N_{sc}$). In another example, the dedicated frequency resource indicates that $I_{SC}$ is used as an explicitly configured parameter, and the dedicated frequency resource indicates that it can be acquired according to the following formula: $I_{period} = (N_{UEID}/(N_{Mask}-1))$ mod ($N_{Period}$).

For all the above examples, if a DVI is indicated by using a scrambling sequence index, which is not used for transmitting an NPRACH by multi-UE multiplexing, the formulas of the above examples are required to be modified. For example, for all the dedicated time resource and the frequency resource being acquired through a system rule, at this time, the location ($I_{sc}$, $I_{period}$) of a time-and-frequency resource can be determined by a lookup table according to a value of ($N_{UEID}$) mod ($N_{sc} \times N_{Period}$).

Embodiment 2

In this embodiment, a method for reporting scheduling request in an NB IoT system is described, which improves the capacity of a preamble sequence and reduces inter-cell interference through an enhanced NPRACH.

A UE acquires relevant parameter configuration information of a preamble sequence of a cell-level NPRACH, and determines the preamble sequence used in this random access process (which includes but is not limited to an initial access process, a PDCCH order-triggered random access process, and the random access process used for reporting scheduling request in Embodiment 1) according to a preamble sequence acquisition rule.

The preamble sequence acquisition rule can be a system-given rule. For example, if a cell-level configured preamble sequence is assumed to be a unique sequence, all the UEs within the cell all use the preamble sequence, and the index of the cell-level preamble sequence can be computed according to a cell ID. For example, $i=N_{PCID} \mod N_{preamble}$, where i is the preamble sequence index used by all the UEs of the cell, $N_{PCID}$ is the cell identity, and $N_{preamble}$ is the number of the preamble sequence in the configured preamble sequence set. Cell-level configured preamble sequences are assumed to be multiple, that is, one preamble sequence set. The set index can also be computed according to a cell identity. For example, $i_{group}=N_{PCID} \mod N_{group}$, where $i_{group}$ is the index of the configured preamble sequence set of the cell, $N_{PCID}$ is the cell identity, and $N_{group}$ is the number of the configured preamble sequence set. At this time, by the certain rule based on which the UE selects a preamble sequence, one of a plurality of configured preamble sequences can be selected by the UE to perform random access, or when the UE performs different types of random access processes, a preamble sequence is selected based on different rules. For example, in a contention-based random access process, the UE randomly selects one of a plurality of configured preamble sequences. In a contention-free random access process, the UE acquired the used preamble sequence according to eNB explicitly configuration or a certain system rule, and the explicitly configuration mode and system rule are the same with that described in Embodiment 1. Preamble sequences (or preamble sequence sets) configured in different cells can be different or not completely same, which is used for reducing inter-cell interference when an eNB receives an NPRACH.

A preamble sequence format, comprising length and sequence generation type, can be fixed by a system and can have different implementation modes below.

1. the length of the preamble sequence is the same with number of several repetitions of the NPRACH, the number of the several repetitions is a value fixed by the system, which is set as $M_{rep}$, the value of $M_{rep}$ is the submultiple of the number of the total repetitions, and the maximum value is the number of the total repetitions of the NPRACH. During a single repetition of the NPRACH, a same element of the preamble sequence is transmitted by each symbol, and during the $M_{rep}$ repetitions, each element is transmitted in preamble sequence in each repetition of the NPRACH. For a plurality of repeated transmission of the NPRACH, $M_{rep}$ repetitions are used as a granularity unit to perform repetition for the preamble sequence.

2. the length of the preamble sequence is the same as the number of the symbol groups of the NPRACH, that is, the length is 4, one element of the preamble sequence is transmitted repeatedly by all symbols of one symbol group of the NPRACH, each element of the preamble sequence is transmitted in sequence according to a sequence of symbol groups in the single NPRACH, and a same preamble sequence is transmitted with in each repetition of the NPRACH.

3. the length of the preamble sequence is the same with number of the total symbols of several repetitions of the NPRACH, the number of the several repetitions is a value fixed by the system, which is set as $M_{rep}$, the value of $M_{rep}$ is the submultiple of the number of the total repetitions, and the maximum value is the number of the total repetitions of the NPRACH. During $M_{rep}$ repetitions, different elements of the preamble sequence are transmitted in sequence by each oft-repeated symbol of the NPRACH. For a plurality of repeated transmission of the NPRACH, $M_{rep}$ repetitions are used as a granularity unit to perform repetition for the preamble sequence.

Figure 6:
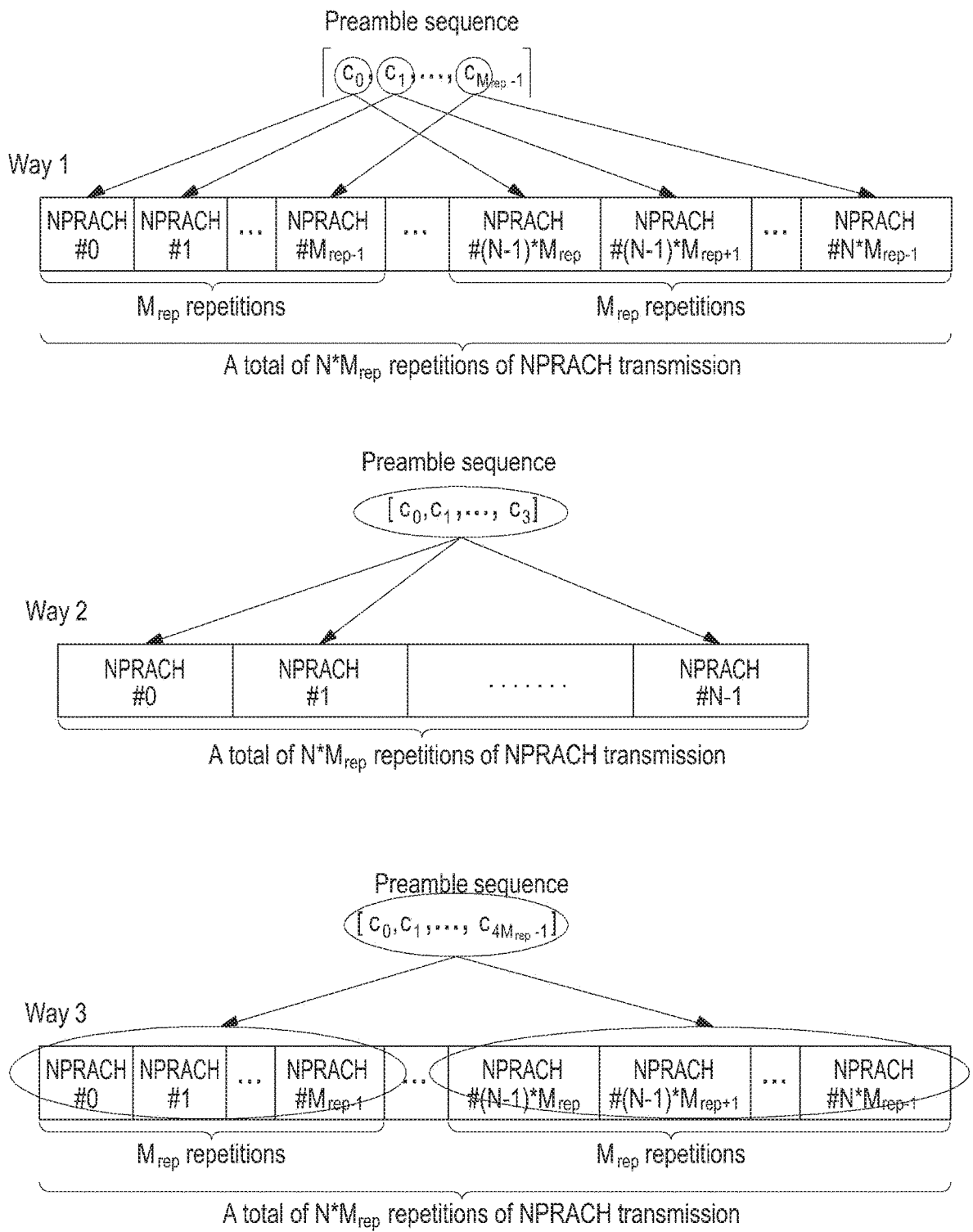
FIG. 6 is schematic diagram of a plurality of implementations of a preamble sequence according to an embodiment of the disclosure.

FIG. 6 is schematic diagram of a plurality of implementations of a preamble sequence according to an embodiment of the disclosure.

Referring to FIG. 6, the schematic diagram of the three implementation modes of the preamble sequence formats is illustrated. When the value of all the elements of the preamble sequence is 1, the implementation effect of the three implementation methods is same. The rule of the generation of the preamble sequence is the same with that of the generation of the scrambling sequence in Embodiment 1, and will not be repeated here.

FIG. 7 is a schematic diagram of an NPRACH cyclic prefix format according to an embodiment 2.

Referring to FIG. 7, when a same symbol is transmitted in each symbol group of an NPRACH, an original cyclic prefix in an existing NPRACH format and one or more symbol are aggregated to form a new cyclic prefix, which is used for supporting a larger cell radius. For example, a cyclic prefix of an NPRACH Format 1 and first two symbols are aggregated to form a new cyclic prefix, used for supporting a cell radius larger than 100 km.

Figure 8:
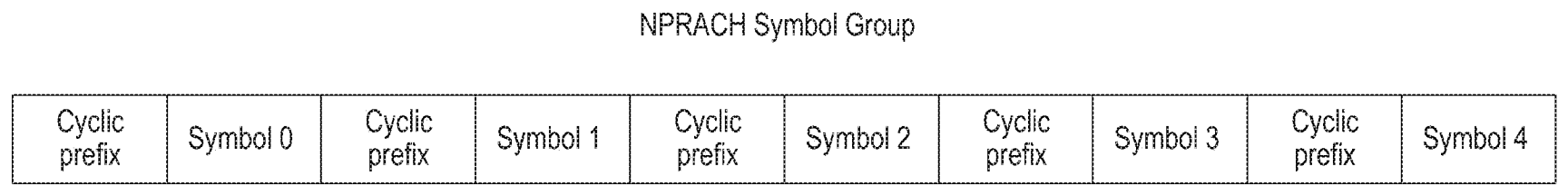

FIG. 8 is a schematic diagram of another NPRACH cyclic prefix format according to an embodiment 2.

Referring to FIG. 8, when different symbols in each symbol group of an NPRACH are transmitted, a cyclic prefix is required to be added before each symbol to avoid inter-symbol interference. In another example, the front symbol(s) are used as the cyclic prefix of the latter symbol if there are same continuous symbols within one symbol group of NPRACH. At the same time, the NPRACH format can use scrambling scheme 4 of NPRACH scrambling is illustrated in the embodiment described with respect to FIG. 5. The NPRACH format can also be based on the current NPRACH format, and a fixed frequency offset is added on the neighboring symbol groups of NPRACH. Take an example of 1.25 kHz frequency offset, and then the time signals of the $I_{th}$ symbol group can be generated according to the following formula:

$$s_i(t) = \beta_{NPRACH} e^{j2\pi(n_{sc}^{RA}(i)+Kk_0+1/2+\Delta_i)\Delta f_{RA}(t-T_{CP})}$$

Wherein, $\Delta_i$ denotes the frequency shift on the symbol group $\beta_{NPRACH}$ is an amplitude scaling factor, $k_0=-N_{sc}^{UL}/2$ and $K=\Delta f/\Delta f_{RA}$ denotes a ratio of a subcarrier spacing $\Delta f$ of an uplink data channel to a subcarrier spacing $\Delta f_{RA}$ of an NPRACH, $N_{sc}^{UL}$ denotes number of uplink subcarriers, $n_{sc}^{RA}(i)$ denotes an index of an NPRACH subcarrier, and $\tilde{n}_{sc}^{RA}(i-1)$ is a subcarrier offset of an NPRACH symbol group frequency hopping.

In this example, the values of frequency shift (i.e., $\Delta_i$) for different symbol groups can be either the same or different. One example of different frequency shift for different symbol group can be $$\Delta_l = \begin{cases} -1/4 & i \bmod 4 = 1, 3 \text{ and } \tilde{n}_{sc}^{RA}(i-1) \bmod 2 = 0 \\ 1/4 & i \bmod 4 = 1, 3 \text{ and } \tilde{n}_{sc}^{RA}(i-1) \bmod 2 = 1 \end{cases},$$

which represents −1.25 kHz frequency shift between symbol group 0 and symbol group 1, and 1.25 kHz frequency shift between symbol group 2 and symbol group 3. The value of $\Delta_i$ is determined by the ratio of frequency shift and subcarrier spacing of NPRACH, e.g., when the frequency shift is 1.25kHz and the subcarrier spacing of NPRACH is 3.75 kHz, then $\Delta_i$ is −¼. The value of frequency shift can be obtained by the UE according to cell identity and/or a definition of NPRACH format, e.g., the frequency shift is determined by $N_{ID}^{cell} \bmod N_{NPRACH,fs}$, where $N_{ID}^{cell}$ is cell identity, $N_{NPRACH,fs}$ is the number of candidate frequency shift values, mod denotes the Modulus calculation; or, according to the configured NPRACH format by eNB to obtain different value of frequency shift on different symbol groups as the above example; or in a combined way, to obtain a unified frequency shift of all the symbol groups according to cell identity and then obtain the additional frequency shift for neighboring symbol groups according to NPRACH format.

Except $\Delta_i$, the value and the specific meaning of all the above parameters can refer to the 3GPP TS36.211 V13.3.0 specification. The above method of frequency shift on NPRACH symbol groups can be applied with any frequency hopping pattern.

An eNB can independently configure different NPRACH Formats for each repeated level of each NPRACH, which is used for performance detection of the random access channels (RACHs) of a nearer UE and a farther UE to the eNB simultaneously, in the case of a larger cell radius.

In another example, a UE can acquire at least two NPRACH format configurations and a configuration of each NPRACH Format to one or more NPRACH repeated levels. The UE selects an NPRACH Format and a repeated level according to a certain rule, and the rule can be one to one fixed correspondence between an NPRACH Format and an NPRACH repeated level. For example, the eNB configures two NPRACH Formats, which may be NPRACH Format 0 and NPRACH Format 1. The system rule is that the NPRACH Format 1 is applicable to a repeated level of a repeated number of an NPRACH being larger than a certain threshold, while the NPRACH Format 0 is applicable to a repeated level of repeated number of an NPRACH being lower than the threshold, and the threshold can be fixed or informed by an eNB through a signaling. After the UE determines the selected repeated level of the NPRACH according to a reference signal receiving power obtained by downlink measurement, the NPRACH Format is determined according to the repeated level. In another example, the UE first selects an acquiescent NPRACH Format, then decides whether to update the NPRACH Format according to a certain rule, and retransmits a random access channel. The rule of updating NPRACH Format can be that, a UE random access fails, the attempts of the random access have reached a maximum number, and the repeated level of an NPRACH selected currently by the UE is a level when a system configures a maximum repeated level of an NPRACH, and a random access process is reinitiated after the NPRACH Format is updated.

In yet another example, the configuration mode of an eNB may combine the above two configurations. For example, different NPRACH Formats can be independently configured for one or more repeated levels of an NPRACH in all repeated levels of an NPRACH of a cell by an eNB. For a repeated level of an NPRACH not explicitly configured by an NPRACH Format, the NPRACH Format is determined by an UE according to a certain system rule. For example, the system rule can be that, as described above, there is correspondence between an NPRACH Format and a repeated level of an NPRACH. In another system rule, a certain NPRACH Format, such as NPRACH Format 0, is fixedly used.

The scrambling enhanced-mode of NPRACH in Embodiment 1 can be combined with the preamble sequence configuration in this embodiment, or they are used respectively and independently.

Embodiment 3

In this embodiment, a method for reporting scheduling request in an NB IoT system is described, which uses a dedicated physical channel (NPUSCH Format 2) to transmit a scheduling request. After receiving anNPDCCH ends, a UE can perform the feedback of hybrid automatic repeat request (HARQ)-ACK information of the PDCH and/or transmit a scheduling request according to a configuration information and/or a certain rule.

Way 1:

The transmission including a scheduling request can use an NPUSCH Format 2, which uses a same physical channel with the HARQ-ACK feedback, but the two respectively use different time-and-frequency resources and carry different information contents. When the NPUSCH Format 2 is used for reporting a scheduling request, the code word formats of an uplink control information can be shown in Table 1, that is, 1 bit scheduling request information is transmitted:

TABLE 1

| Scheduling request bit | Scheduling request code words $<b_0, b_1, b_2, \ldots, b_{15}>$ |
|---|---|
| 0 | <0, 0, 0, 0, 0, 0, 0, 0, 0, 0, 0, 0, 0, 0, 0, 0,> |
| 1 | <1, 1, 1, 1, 1, 1, 1, 1, 1, 1, 1, 1, 1, 1, 1, 1,> |

In another example, the orthogonal code words are used for carrying multi-bit DVI. The codeword sequences is generated to ensure orthogonality of modulated codeword sequences (e.g., Walsh code), to ensure the semi-orthogonality of the aggregated modulated codeword sequences and demodulation reference signal sequences, to adopt semi-orthogonal complex sequences, e.g., m sequence, or to adopt orthogonal complex sequences (e.g., DFT sequence). Table 2 provides a code word format example of transmitting 2 bit DVI:

TABLE 2

| DVI bit | Scheduling request code words $<b_0, b_1, b_2, \ldots, b_{15}>$ |
|---|---|
| 00 | <0, 0, 1, 1, 0, 0, 1, 1, 0, 0, 1, 1, 0, 0, 1, 1,> |
| 01 | <1, 1, 1, 1, 1, 1, 1, 1, 1, 1, 1, 1, 1, 1, 1, 1,> |

TABLE 2-continued

| DVI bit | Scheduling request code words <$b_0, b_1, b_2, \ldots, b_{15}$> |
|---|---|
| 10 | <0, 1, 0, 1, 0, 1, 0, 1, 0, 1, 0, 1, 0, 1, 0, 1,> |
| 11 | <1, 0, 1, 0, 1, 0, 1, 0, 1, 0, 1, 0, 1, 0, 1, 0,> |

In another example, the eNB configures a dedicated scheduling request code word for each UE, and the scheduling request is reported by the UE. That is, the NPUSCH Format 2 carrying the dedicated scheduling request code word is transmitted on the configured time-and-frequency resource, otherwise, the NPUSCH Format 2 is not transmitted. At this time, different UEs can transmit a scheduling request in a NPUSCH Format 2 at a same time-and-frequency resource location, and scheduling requests of a plurality of UEs are recognized by an eNB through blind detection. Table 3 provides an example of allocating, by an eNB, multi-UE scheduling request code word:

TABLE 3

| UE index | Scheduling request code words <$b_0, b_1, b_2, \ldots, b_{15}$> |
|---|---|
| 1 | <0, 0, 1, 1, 0, 0, 1, 1, 0, 0, 1, 1, 0, 0, 1, 1,> |
| 2 | <1, 1, 1, 1, 1, 1, 1, 1, 1, 1, 1, 1, 1, 1, 1, 1,> |
| 3 | <0, 1, 0, 1, 0, 1, 0, 1, 0, 1, 0, 1, 0, 1, 0, 1,> |
| 4 | <1, 0, 1, 0, 1, 0, 1, 0, 1, 0, 1, 0, 1, 0, 1, 0,> |

In this method, a same fixed scheduling request code word can be enabled to be used by all the UEs, thus the time-and-frequency resource location used while different UEs transmit scheduling requests is required to be different. At this time, the eNB blind detects and recognizes a scheduling request of a UE at each UE-specific time-and-frequency resource location.

The time-and-frequency resources, which are used for transmitting an NPUSCH Format 2 including a scheduling request, can be determined according to a configuration information and/or a third system rule. The time-and-frequency resources at least include the start subframe (and/or scheduling request periodicity), index of subcarrier, and repetition number. For example, when a scheduling request information is transmitted at a time-and-frequency resource location that is configured by a UE-specific signaling, wherein the UE-specific signaling can be transmitted by an NPDSCH or an NPDCCH. When it is transmitted by an NPDCCH, the UE-specific signaling can be carried in the downlink grant, and is a dynamic configuration information, and is a quasi-static configuration when it is transmitted by the NPDSCH.

In this embodiment, when the dedicated physical channel is an NPUSCH Format 2, the repetition number of dedicated channel for scheduling request can be obtained based on that for HARQ-ACK, e.g., use the same repetition number, or the repetition number for HARQ-ACK transmission added/multiplexed by an offset, which is fixed or configured by eNB. Under the same condition, a subcarrier index for transmitting a scheduling request can be acquired according to a subcarrier index transmitting an HARQ-ACK which is configured in a downlink grant. The third system rule is used for defining the frequency interval between the two subcarrier indexes, or for defining the time interval from an end time of an NPUSCH Format 2 bearing an HARQ-ACK to an NPUSCH Format 2 transmitting and bearing a scheduling request. The details are as follows:

The configuration information may be location of time-and-frequency resource while being explicitly configured. For example, the method described with respect to Embodiment 5 can be indicated in a subcarrier index and transmission or a carrier, a subcarrier index and transmission time. The transmission time can be an index of time unit of transmitting a scheduling request, and the time unit of transmitting a scheduling request can be a fixed period of time, for example, a subframe or a fixed number of subframes. The transmission time can also be defined according to timing relationship, for example, the time interval of indicating how long the NPUSCH Format 2 bearing a scheduling request is transmitted from the end time of the NPUSCH Format 2 bearing HARQ-ACK. The indicating of the used carrier signaling contents can be a frequency interval indicating the used carrier and the anchored carrier (or non-anchored carrier used for current uplink/downlink data transmission by a UE), or allow a UE to use a fixed-location carrier to transmit a scheduling request. At this time, the frequency resource configuration can merely explicitly indicate a subcarrier index on a carrier that is used for transmitting a scheduling request, and the fixed-location carrier can be a non-anchored carrier having a fixed frequency offset with the anchored carrier.

Similarly, the time-and-frequency resource location of a physical channel for transmitting a scheduling request can also be implicitly indicated according to a third system rule, for example, according to carrier location, configured in downlink grant, for transmitting HARQ-ACK and a subcarrier index, acquiring the subcarrier location and the subcarrier index, for transmitting a scheduling request. The system rule can be that the two subcarriers are located on a same carrier and there is a fixed interval between indexes, or the two carriers have a fixed frequency offset and the subcarrier indexes are same. As for the time resource, the NPUSCH Format 2 including a scheduling request can be enabled to be transmitted, after a fixed time from the end time of the NPUSCH Format 2 bearing HARQ-ACK. Meanwhile, a resource configuration method with two dimensions of time and frequency can also adopt an explicit-and-implicit-combined mode, that is, the one is configured explicitly and another is acquired according to a system rule.

After acquiring a time-and-frequency resource configuration for transmitting a scheduling request, a UE can decide whether to transmit the scheduling request according to a configuration and/or a second system rule. For example, the second system rule can be deciding whether being allowed to report a scheduling request according to a signaling transmitted by a UE.

The decision process can be that an eNB transmits a signal to indicate whether the UE is allowed to transmit a scheduling request. After acquiring an indication of being allowed to transmit a scheduling request, a UE transmits a physical channel carrying a scheduling request bit on the configured time-and-frequency resource, and carrying bit 1 in Table 1 when there is a scheduling request and carrying bit 0 in Table 1 when there is no scheduling request.

The decision process can be that an eNB transmits a signal to indicate whether the UE is allowed to transmit a scheduling request. After acquiring an indication of being allowed to transmit a scheduling request, the UE decides whether to transmit a scheduling request according to a second system rule. The second system rule can be that, only when the HARQ-ACK bit requiring feedback is 1 (that is, ACK information), the UE transmits a physical channel including a scheduling request bit, and at this time, the physical channel including an HARK-ACK information can be transmitted or not be transmitted. For example, when the two transmission times configured by the two physical channels have an overlap to each other, and the physical channel bearing HARK-ACK information is not transmitted when a scheduling request is transmitted.

The decision process can also be that a UE decides whether to transmit a scheduling request merely according to a second system rule, and the second system rule is same as that in the above described.

A may UE decide whether the transmitting of a scheduling request is completed according to a certain rule (e.g., a second decision rule), consider the transmitting a scheduling request is completed when the UE receives an uplink grant within a time window, and the scheduling request is not attempted to be transmitted. Otherwise, the scheduling request is continually reattempted to be transmitted. And the time-and-frequency resource configuration mode used for reattempting to transmit the scheduling request can be same or different with the time-and-frequency resource configuration mode in the initial transmission, and the available configuration mode can be the above described.

Way 2:

The transmitting of a scheduling request can use a dedicated physical uplink channel to transmit piggybacked scheduling request bit with HARQ-ACK on the same time-and-frequency resource.

When the dedicated physical channel is an NPUSCH Format 2 with a high-order modulation mode or an NPUSCH Format 2 using more than two code words, the time-and-frequency resource, configured in a downlink grant, is used for transmitting scheduling request and HARQ-ACK information.

The dedicated physical uplink channel can be an NPUSCH Format 2 introducing a high-order modulation mode (for example, quadrature phase shift keying (QPSK) modulation), which simultaneously carries 1 bit of scheduling request (or, multi-bit DVI) and 1 bit of HARQ-ACK information, wherein the code words of the scheduling request bit is shown in Table 1 (DVI code words shown in Table 2). There are different ways for generating QPSK modulation signals. For example, the code words of a scheduling request bit is assumed to be $[b_0, b_1, \ldots, b_{15}]$, and the code words of an HARQ-ACK bit is $[a_0, a_1, \ldots, a_{15}]$, 16 QPSK modulation signals are generated in sequence based on $(a_n, b_n)$, n=0, . . . , 15. One example for QPSK constellation mapping can be as follows. The real part of a QPSK can be enabled to carry the code words of the HARQ-ACK bit, while the imaginary part carries the code words of the scheduling request bit, that is, the $n^{th}$ QPSK modulation symbol is $$s_n = \frac{1}{\sqrt{2}} \cdot (a_n + i \cdot b_n),$$

wherein $i=\sqrt{-1}$ is the imaginary unit. In another example, the QPSK constellation mapping method in 3GPP TR36.211 specification can also be used. The code words of HARQ-ACK can inherit the existing method, i.e., to use 16-length all "0" sequence and all "1" sequence to indicate NACK and ACK respectively. The code words of scheduling request is also designed to carry 1-bit information, as in Table 1, to use 16-length all "0" sequence and all "1" sequence to indicate non-existence and existence of scheduling request, respectively.

Or, after the code words of the HARQ-ACK bit and the code words of the scheduling request bit are arranged and combined in a certain order, the combined sequences are modulated, the combined sequence is assumed to be $[c_0, c_1, \ldots, c_{31}]$, wherein $c_n=a_k$ or $c_n=b_k$, $0 \leq k \leq 15$. Again, 16 QPSK modulation signals are generated in sequence based on $(c_{2i}, c_{2i+1})$, i=0, . . . , 15. The method of QPSK constellation mapping is the same as above. To reduce the peak to average power ratio, phase rotated QPSK, e.g., $\frac{\pi}{4} - QPSK$ or $\frac{\pi}{2} - QPSK$, can be used, and the signal can be generated with the same method of uplink signal generation in Release 13 and 14 NB-IoT.

The dedicated physical channel can also be an NPUSCH Format 2 carrying an on-off scheduling request signal. For example, when a UE is required to transmit a scheduling request, the QPSK signals are transmitted on the dedicated physical channel. The code word corresponding to the transmitted HARQ-ACK bit is assumed to be $[a_0, a_1, \ldots, a_{15}]$, and the code word corresponding to the scheduling request signal is $[b_0, b_1, \ldots, b_{15}]$. Again, 16 QPSK modulation signals are generated in sequence based on $(a_n, b_n)$, n=0, . . . , 15, and the method of QPSK constellation mapping is the same as above. The code words for scheduling request carries on-off signal, as in Table 4, i.e., the UE indicate existence or non-existence of scheduling request by sending or not sending the code word. Similarly, phase rotated modulation can be used to reduce peak to average power ratio, as described above.

TABLE 4

| Scheduling request bit | Scheduling request code words $<b_0, b_1, b_2, \ldots, b_{15}>$ |
|---|---|
| 1 | <1, 1, 1, 1, 1, 1, 1, 1, 1, 1, 1, 1, 1, 1, 1, 1,> |

When the UE transmits HARQ-ACK without a scheduling request, the modulation method of the dedicated physical channel is BPSK, which is exactly the same with the NPUSCH Format 2 for HARQ-ACK only transmission in Release 13 and 14 NB-IoT. When carrying an on/off scheduling request signal, the dedicated physical channel carrying QPSK signals can be configured with different repetition number from HARQ-ACK only transmission because their detection performances are different. When the off signal is transmitted (that is, a scheduling request is not transmitted), the detection performance is better, and the dedicated physical channel can be transmitted with less repetitions to reduce energy consumption of UE. The repetition number for the HARQ-ACK only transmission and the HARQ-ACK piggybacked with scheduling request signal can be configured by radio resource control (RRC) signaling, respectively. In another example, the eNB can configure one repetition number and the UE determines the repetition number for dedicated channel based on uplink control information content. For example, the repetition number of the dedicated physical channel configured by the eNB is assumed to be $N_{rep}$. When a scheduling request is transmitted, the UE transmits the dedicated physical channel, the repetition number of which is $N_{rep}$ (or $\lceil M \cdot N_{rep} \rceil$). When a scheduling request is not transmitted, the repetition number is $\lceil M \cdot N_{rep} \rceil$ (or $N_{rep}$), wherein $\lceil x \rceil$ denotes the smallest integer greater than or equal to x, and M is a positive number with fixed or configured value by eNB.

The dedicated physical can also be an NPUSCH Format 2 introducing more code words (for example, more than two code words), the code words are used for indicating a scheduling request and an HARQ-ACK information. For example, besides the current all-zeros sequence that the indication HARQ-ACK bit being 0 and the current all-ones sequence that the indication HARQ-ACK bit being 1, more orthogonal code word sequences are used for indicating an additional 1 bit of scheduling request information. The codeword sequences are generated to ensure orthogonality of modulated codeword sequences (e.g., Walsh code), to ensure the semi-orthogonality of the aggregated modulated codeword sequences and demodulation reference signal sequences, to adopt semi-orthogonal complex sequences (e.g., m sequence), or to adopt orthogonal complex sequences (e.g., DFT sequence). Table 5 shows an example of a code word format table of uplink control information, which is scheduling request bit $O^{SR}$ and HARQ-ACK bit $O^{ACK}$ as follows:

TABLE 5

| $<O^{SR}, O^{ACK}>$ | Code words <b0, b1, b2, . . . , b15> |
|---|---|
| 00 | <0, 0, 0, 0, 0, 0, 0, 0, 0, 0, 0, 0, 0, 0, 0, 0> |
| 01 | <1, 1, 1, 1, 1, 1, 1, 1, 1, 1, 1, 1, 1, 1, 1, 1> |
| 10 | <0, 1, 0, 1, 0, 1, 0, 1, 0, 1, 0, 1, 0, 1, 0, 1> |
| 11 | <1, 0, 1, 0, 1, 0, 1, 0, 1, 0, 1, 0, 1, 0, 1, 0> |

When the dedicated physical channel transmits piggybacked scheduling request bit with an ACK/NACK information bit, the used subcarrier and the transmission start time are respectively the subcarrier and the transmission start time used for the NPUSCH Format 2 indicated in the downlink grant. The repetition number can be configured by RRC signaling, e.g., use the repetition number for the NPUSCH Format 2 indicated in an RRCConnectionReestablishment-NB information. Otherwise, the UE can determine the repetition number for a dedicated channel based on uplink control information content. For example, the repetition number of the dedicated physical channel configured by the eNB is assumed to be $N_{rep}$. When a scheduling request is transmitted, the UE transmits the dedicated physical channel, the repetition number of which is $N_{rep}$ (or $\lceil M \cdot N_{rep} \rceil$). When a scheduling request is not transmitted, the repetition number is $\lceil M \cdot N_{rep} \rceil$ (or $N_{rep}$), wherein $\lceil x \rceil$ denotes the smallest integer greater than or equal to x, and M is a positive number with fixed or configured value by eNB.

A UE decides whether the transmitting a scheduling request is completed according to a second decision rule, and considers the transmitting a scheduling request to be completed when the UE receives an uplink grant within a RAR time window, and the scheduling request is not attempted to be transmitted. Otherwise, the scheduling request is continually attempted to be transmitted. The physical channel used for reattempting to transmit the scheduling request can be different with the physical channel used for initially transmitting the scheduling request. For example, the physical channel used for reattempting to transmit the scheduling request is an NPUSCH Format 2 and the physical channel used for initially transmitting the scheduling request is the dedicated physical channel described by this method. And the time-and-frequency resource configuration mode used for reattempting to transmit the scheduling request can be same or different with the time-and-frequency resource configuration mode in the initial transmission, and the available configuration mode can be the configuration mode described by Way 1 and Way 2.

Embodiment 4

In this embodiment, a method for reporting scheduling request in an NB IoT system is described, which is used for reporting scheduling request on a semi-static-configured time-and-frequency physical resource.

The mode, of acquiring the configured frequency physical resource and time physical resource by a UE, can multiplex the NPUCCH resource transmitted by a LTE scheduling request and the mode of transmission instance. The dedicated physical channel for transmitting a scheduling request, as described above with reference to Embodiment 2, can multiplex a current NPUSCH Format 2, or can use the dedicated physical channel as described in Way 2 of Embodiment 3, After acquiring, by a UE, the time-and-frequency resource used for transmitting a scheduling request, when the UE transmits a scheduling request at this time, the UE is required to determine the time-and-frequency resource for transmitting a scheduling request or terminate the transmitting a scheduling request.

The UE can determine whether to reattempt to report a scheduling request according to a second decision rule. The decision process can be that, for example, deciding whether to report a scheduling request and, if not, continually deciding, at this time, whether there is a conflict between the available time-and-frequency resource used for transmitting a scheduling request by a UE and the time-and-frequency resource used for transmitting the uplink physical channel by the UE If there is a conflict, the reporting of a scheduling request can be abandoned, or a time frequency is updated, which is used when reporting a scheduling request according to a updating rule. The updating rule comprises deferring to report a scheduling request or using an adjacent subcarrier of a subcarrier used by an NPUSCH Format 2.

For example, when the UE determines there is a conflict between the available time-and-frequency resource used for transmitting a scheduling request by a UE and the time-and-frequency resource used for transmitting the uplink physical channel by the UE, the UE can abandon reporting a scheduling request, or select a new resource to transmit a scheduling request or an uplink physical channel according to a certain rule (that is, an updating rule).

For example, as for an uplink shared channel format 1 or uplink shared channel format 2, when there is a conflict between the time-and-frequency resource used for transmitting by an eNB and the resource of a scheduling request, the UE can defer to transmit a scheduling request (or defer to transmit an uplink shared channel format 1/uplink shared channel format 2), and transmit on the first time-and-frequency resource being capable of transmitting a scheduling request after the transmitting the uplink shared channel format 1/uplink shared channel format 2 ends (or, starting to transmit the uplink shared channel format 1/uplink shared channel format 2 after a fixed time from the scheduling request transmission end). In another example, as for an uplink shared channel format 1 and uplink shared channel format 2, when there is a conflict between the scheduled time-and-frequency resource and the resource of the scheduling request, a scheduling request can be transmitted, according to a certain rule, on a frequency resource configured not by the two formats, and the rule can be a neighbor subcarrier of a subcarrier used when an uplink shared channel format 1 and uplink shared channel format 2 are used. Similarly, an uplink shared channel format 1 and uplink shared channel format 2 can be enabled to use the frequency resource not configured by the two formats to perform transmission. As for a downlink channel, for example, a physical downlink control channel and a physical downlink shared channel, if at this moment, the UE is required to report a scheduling request, but the receiving of an uplink channel is being performed, the UE terminates to report a scheduling request or defers to transmit a scheduling request, until the UE can perform uplink transmission. As for an uplink random access channel, when there is a resource configuration conflict, the UE does not transmit a scheduling request on a random access channel resource configured by a system, it can be deferred to transmit the scheduling request or select a new subcarrier to transmit a scheduling request according to a certain rule, and the rule is same with the above described. If at this moment, the UE is during an uplink gap period, the UE can abandon the transmitting of a scheduling request.

Embodiment 5

In this embodiment, a method for configuring a time-and-frequency resource is described, which can be used for transmitting a physical channel for a scheduling request, the physical channel at least comprises an NPRACH or NPUSCH Format 2.

In operation 1, an eNB can configure a reserved time-and-frequency block used for transmitting a scheduling request physical channel. The specific mode can be that, the UE configures part of all the initial subcarriers of repeated levels of an NPRACH to be used for an NPRACH (parameters nprach-NumCBRA-StartSubcarriers can pass through, and it is a prior technology) used for a contention-based random access, and the other reserved initial subcarriers can be used for transmitting an NPRACH which is activated by an NPDCCH order, and/or used for a physical channel for reporting scheduling request. The physical channel at least comprises one of the following: NPUSCH Format 2, a non-frequency hopping transmission NPRACH (that is, a plurality of symbol groups of the NPRACH and multi-repetitions of the NPRACH are all transmitted on a same subcarrier), and a frequency hopping transmission NPRACH. When the part of the reserved subcarriers are used for transmitting the physical channel for reporting scheduling request, the number of the reserved initial subcarriers is required to be greater than or equal to multiples of 12.The eNB can select 12 or multiples of 12 neighbor reserved initial subcarriers to be used for transmitting the physical channel for reporting scheduling request, and other parts of the reserved initial subcarriers for transmitting an NPRACH which is activated by an NPDCCH order.

Figure 11:
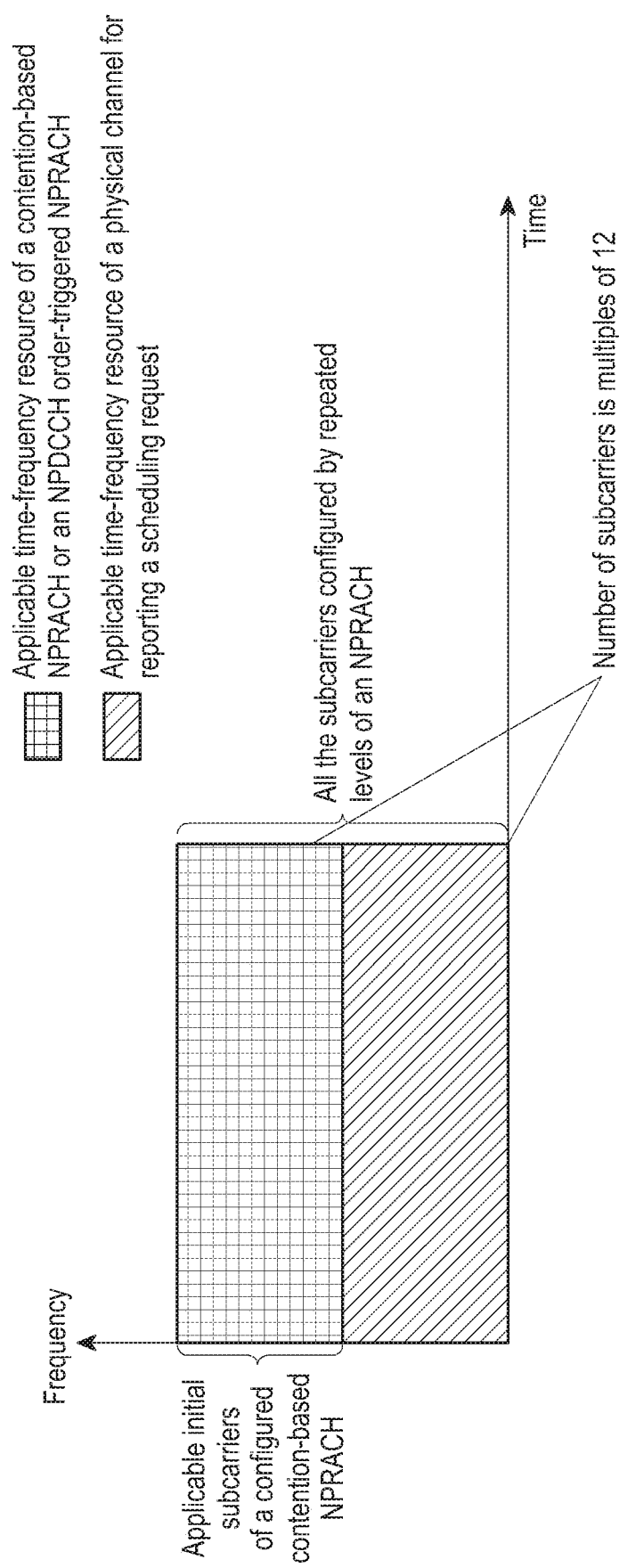
FIG. 11 is a schematic diagram of the configuring an NPRACH resource by an evolved node B (eNB) according to an embodiment of the disclosure.

FIG. 11 is a schematic diagram of the configuring an NPRACH resource by an eNB according to an embodiment of the disclosure.

In operation 2, the UE can acquire the UE-specific time-and-frequency resource allocation information of the physical channel, which is configured by the eNB, for transmitting a scheduling request. The UE is first required to acquire the repeated level of NPRACH to which the reserved resource, used by the physical channel for transmitting a scheduling request, belongs. The selection of the repeated level of the NPRACH can multiplex the repeated level of the NPRACH selected during the initial access of the UE, or can be configured by the eNB through a signaling. In addition, the UE needs to acquire a start time, a transmission time and a subcarrier index (equivalent to that the subcarrier index is an initial subcarrier index when the physical channel for a scheduling request is an NPRACH Format 0 or NPRACH Format 1). When there are more than one subcarrier interval configuration in the physical channel for transmitting a scheduling request (for example, the physical channel for transmitting a scheduling request is an NPUSCH Format 2), the eNB is required to configure a subcarrier interval for each UE, wherein the subcarrier interval can multiplex the uplink subcarrier interval configuration obtained by the UE during a random access, or is further configured by the eNB. For example, for the physical channel for transmitting a scheduling request being an NPUSCH Format 2.

Figure 12:
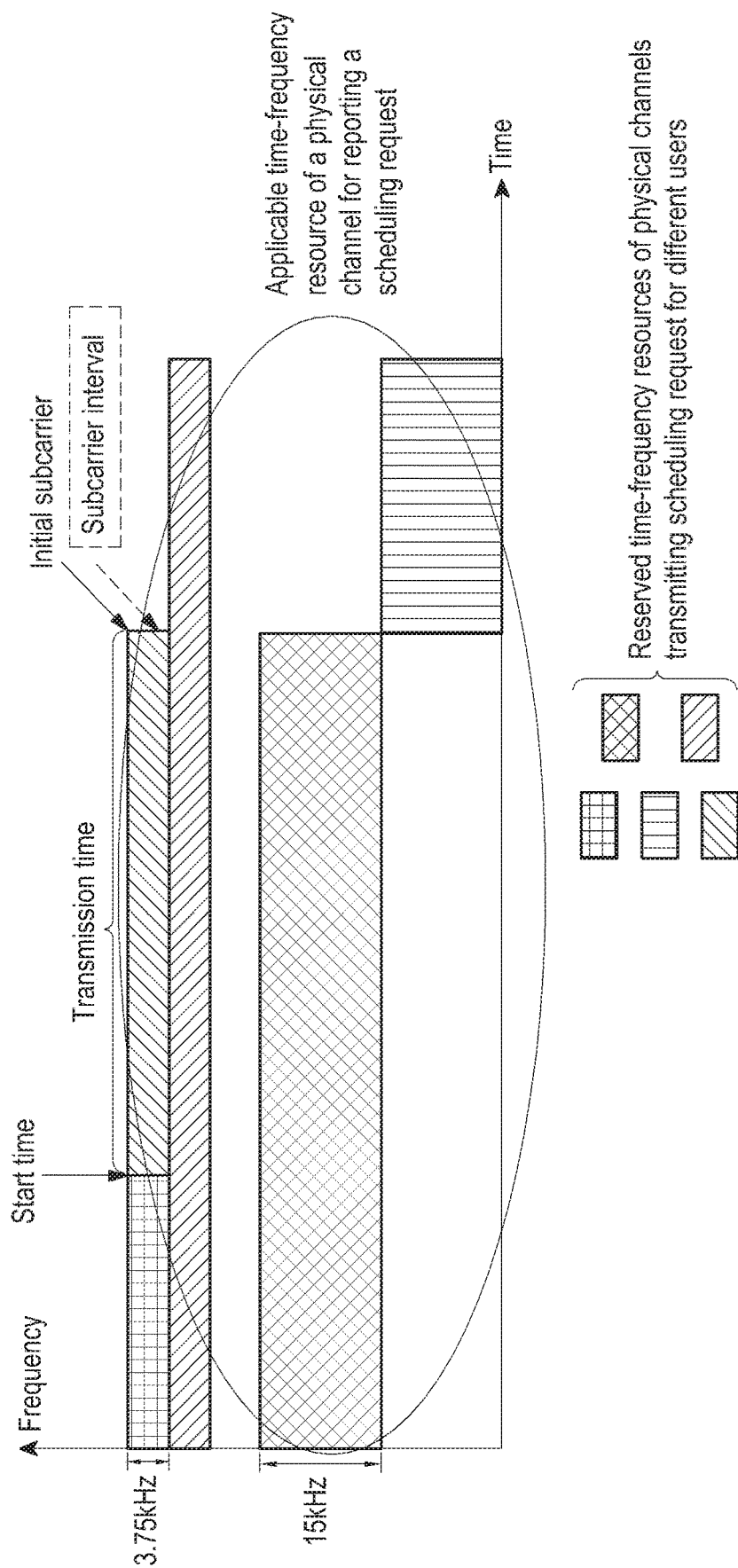
FIG. 12 is a schematic diagram of acquiring, by a user equipment (UE), configuration parameters to obtain time-and-frequency resources of a physical channel transmitting a scheduling request according to an embodiment of the disclosure.

FIG. 12 is a schematic diagram of acquiring, by a UE, configuration parameters to obtain time-and-frequency resources of a physical channel transmitting a scheduling request according to an embodiment of the disclosure.

Referring to FIG. 12, a schematic diagram illustrates acquiring, by a UE, the configuration parameters to obtain time-and-frequency resources of a physical channel transmitting a scheduling request according to an embodiment of the disclosure. The start time can be an arbitrary subframe (or time slot) in a duration time of a reserved resource, as shown in FIG. 12. For the transmission time, the content of which can be the repeated number of the physical channel, or the number of the NPRACH symbol groups (that is, it is allowed that the UE transmits one or more symbol groups to be used for reporting scheduling request). When there is more than one subcarrier interval configuration in the physical channel for transmitting a scheduling request, the initial subcarrier index can be defined according to a subcarrier interval of 3.75 kHz. For example, twelve initial subcarriers (3.75 kHz) are assumed to be reserved in the repeated level of the NPRACH, thus when the subcarrier interval configured by a UE is 15 kHz, and when the subcarrier index is 0, the frequency location of the 1st to the 4th subcarriers of 3.75 kHz is correspondingly used. When the subcarrier index is 1, the frequency location of the 2nd to the 5th subcarriers of 3.75 kHz is correspondingly used. In another example, the frequency location of the subcarriers can be defined according to the subcarrier interval configured actually by the UE. For example, twelve initial subcarriers (3.75 kHz) are assumed to be reserved in the repeated level of the NPRACH, thus when the subcarrier interval configured by a UE is 15 kHz, when the subcarrier index is 0, the frequency location of the 1st to the 4th subcarriers of 3.75 kHz is correspondingly used. When the subcarrier index is 1, the frequency location of the 5th to the 8th subcarriers of 3.75 kHz is correspondingly used, and so on for the frequency locations of other index values.

Figure 9:
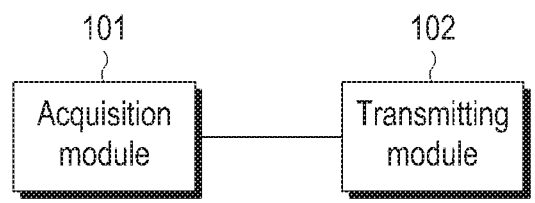
FIG. 9 is a schematic diagram of a device for reporting scheduling request in an NB IoT system according to an embodiment of the disclosure.

FIG. 9 is a schematic diagram of a device for reporting scheduling request in an NB IoT system according to an embodiment of the disclosure.

Referring to FIG. 9, according to an aspect of the disclosure, a device for reporting scheduling request in NB IoT systems is provided, which comprises an acquisition module 101 and a transmitting module 102. The acquisition module 101 is configured to acquire a dedicated physical resource of a physical channel used for reporting scheduling request, wherein the dedicated physical resource comprises a plurality of periodical physical resources. The transmitting module 102 is configured to transmit, when a scheduling request is triggered, the NPRACH on the available dedicated physical resource, so as to report the scheduling request. The device is equipped with one or more applications, wherein the one or more applications are stored in a storage, and are configured to be executed by one or more processors, and the one or more applications are configured to be used for: performing the method for reporting scheduling request in NB IoT systems according to any embodiment as shown in FIG. 2.

Figure 10:
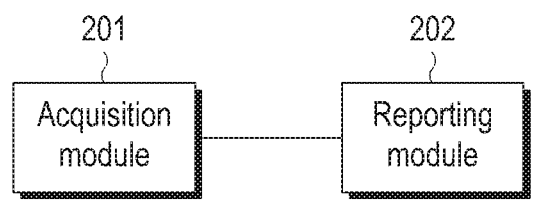
FIG. 10 is a schematic diagram of a device for reporting a scheduling request in an NB IoT system according to an embodiment of the disclosure.

FIG. 10 is a schematic diagram of a device for reporting a scheduling request in an NB IoT system according to an embodiment of the disclosure.

Referring to FIG. 10, according to another aspect of the disclosure, a device for reporting scheduling request in NB IoT systems is provided, which comprises an acquisition module 201 and a reporting module 202. The acquisition module 201 is configured to acquire the time-and-frequency resources of dedicated physical channel for reporting scheduling request. The reporting module 202 configured to transmit the dedicated physical channel on the time-and-frequency resources, so as to report the scheduling request, when a scheduling request is triggered. The dedicated physical channel is a NPUSCH Format 2, or an NPUSCH Format 2 with a high-order modulation mode, or an NPUSCH Format 2 using more than two code words. The device is equipped with one or more applications, wherein the one or more applications are stored in a storage, and are configured to be executed by one or more processors, and the one or more applications are configured to be used for: performing the method for reporting scheduling request in NB IoT systems according to any embodiment as shown in FIG. 3.

FIG. 13 is a schematic diagram of one example of NPRACH cover scrambling used in large cell radius according to an embodiment of the disclosure.

Referring to FIG. 13, according to the method and device for reporting scheduling request in NB IoT systems provided in the above embodiment, efficiency of transmitting a scheduling request information is improved, either a current unlink physical channel is multiplexed to transmit on a UE-specific resource to indicate a scheduling request, or a dedicated physical channel is designed to transmit a scheduling request information.

According to one aspect of the disclosure, an eNB is provided, which is configured to transmit a dedicated physical resource to a UE, so that the UE performs the method for reporting scheduling request in NB IoT systems according to any embodiment of the above, and in this method, the UE is required to acquire the dedicated physical resource.

According to another aspect of the disclosure, an eNB is provided, which is configured to transmit a configuration information to a UE, so that the UE performs the method for reporting scheduling request in NB IoT systems according to any embodiment of the above, and in this method, the UE is required to acquire the time-and-frequency resource information.

It should be understood by those skilled in the art that the disclosure involves devices for carrying out one or more of operations as described in the disclosure. Those devices can be specially designed and manufactured as intended, or can comprise well known devices in a general-purpose computer. These devices have computer programs stored therein, which are selectively activated or reconfigured. Such computer programs can be stored in device (such as computer) readable media or in any type of media suitable for storing electronic instructions and respectively coupled to a bus, the computer readable media include but are not limited to any type of disks (including floppy disks, hard disks, optical disks, a read only memory (ROM), random access memory (RAM), compact disc (CD)-ROM and magneto optical disks), random access memory (RAM), erasable programmable ROM (EPROM), electrically erasable programmable ROM (EEPROM), flash memories, magnetic cards or optical line cards. In other words, the readable media comprise any media storing or transmitting information in a device (for example, computer) readable form.

It can be understood for those skilled in the art that each block of the structure charts and/or block diagrams and/or flowchart illustrations, and combinations of blocks in the structure charts and/or block diagrams and/or flowchart illustrations, can be implemented by computer program instructions. It can be understood for those skilled in the art that the computer program instructions may also be supplied to a general purpose computer, a special purpose computer or other processor capable of programming data processing method for implementation, such that schemes specified in one or more block of the structure charts and/or block diagrams and/or flowchart illustrations are implemented by a computer or other processor capable of programming data processing method.

It can be understood for those skilled in the art that various operations, methods, operations in a flow, measures and schemes that has been discussed in the disclosure may be alternated, changed, combined or deleted. In addition, those with various operations, methods, operations in a flow, measures and schemes that has been discussed in the disclosure may further be alternated, changed, rearranged, disintegrated, combined or deleted. In addition, in the prior art, those with various operations, methods, operations in a flow, measures and schemes that discussed by the disclosure may further be alternated, changed, rearranged, disintegrated, combined or deleted.

While the disclosure has been shown and described with reference to various embodiments thereof, it will be understood by those skilled in the art that various changes in form and details may be made therein without departing from the spirt and scope of the disclosure as defined by the appended claims and their equivalents.

What is claimed is:

1. A method for reporting a scheduling request, the method comprising:
generating modulation symbols $a_i b^i$, based on multiplication of hybrid automatic repeat request (HARQ)-acknowledgement (ACK) feedback $a_i$ with a codeword $b_i$ for the scheduling request; and
transmitting the modulation symbols on a narrowband physical uplink shared channel (NPUSCH),
wherein in case that the scheduling request is to be transmitted using NPUSCH format 2, the codeword for the scheduling request is $b_i$, i=0,1, . . . , 15.

2. The method of claim 1, further comprising generating the HARQ-ACK feedback $a_i$ for the NPUSCH.

3. The method of claim 1, wherein the method for reporting the scheduling request is provided in a narrowband IoT) system.

4. A method for receiving a scheduling request, the method comprising:
receiving modulation symbols on a narrowband physical uplink shared channel (NPUSCH), and
identifying hybrid automatic repeat request (HARQ)-acknowledgement (ACK) feedback a and a codeword b, for the scheduling request, from the received modulation symbols,
wherein the modulation symbols, $a_i b_i$, are generated based on multiplication of the HARQ-ACK feedback $a_i$ with the codeword $b_i$ for the scheduling request,
in case that the scheduling request is to be transmitted using NPUSCH format 2, the codeword for the scheduling request is $b_i$, i=0,1, . . . , 15.

5. The method of claim 4, wherein a method for receiving the scheduling request is provided in a narrowband IoT system.

6. A user equipment (UE) for reporting a scheduling request, the UE comprising:
- a transceiver; and
- a processor coupled with the transceiver and configured to:
  - generate modulation symbols $a_i b_i$, based on multiplication of hybrid automatic repeat request (HARQ) acknowledgement (ACK) feedback $ca_i$ with a codeword $b_i$ for the scheduling request, and
  - transmit the modulation symbols on a narrowband physical uplink shared channel (NPUSCH),
- wherein in case that the scheduling request is to be transmitted using NPUSCH format 2, the codeword for the scheduling request is $b_i, i=0,1,\ldots,15$.

7. The UE of claim 6, wherein the processor is further configured to generate the HARQ-ACK feedback $a_i$ for the NPUSCH.

8. The UE of claim 6, wherein the UE for reporting the scheduling request is included in a narrowband IoT system.

9. An evolved node B (eNB) for receiving a scheduling request, the eNB comprising:
- a transceiver; and
- a processor coupled with the transceiver and configured to:
  - receive modulation symbols on a narrowband physical uplink shared channel (NPUSCH), and
  - identify hybrid automatic repeat request (HARQ)-acknowledgement (ACK) feedback $a_i$ and a codeword $b_i$ for the scheduling request, from the received modulation symbols, wherein the modulation symbols, $a_i b_i$, are generated based on multiplication of the HARQ-ACK feedback $a_i$ with the codeword $b_i$ for the scheduling request, in case that the scheduling request is to be transmitted using NPUSCH format 2, the codeword for the scheduling request is $b_i, i=0,1,\ldots,15$.

10. The eNB of claim 9, wherein the eNB for receiving the scheduling request is included in a narrowband IoT system.

* * * * *